United States Patent
Broumand et al.

(10) Patent No.: US 9,779,408 B2
(45) Date of Patent: Oct. 3, 2017

(54) PRIVACY CONSCIOUS QUALIFICATION OF OPT-IN ADVERTISER OPPORTUNITIES

(75) Inventors: Joseph Broumand, New York, NY (US); Marc Golub, New York, NY (US); Howard Chang, New York, NY (US)

(73) Assignee: Opt-Intelligence, Inc., New York, NY (US)

( * ) Notice: Subject to any disclaimer, the term of this patent is extended or adjusted under 35 U.S.C. 154(b) by 1211 days.

(21) Appl. No.: 13/225,392

(22) Filed: Sep. 2, 2011

(65) Prior Publication Data

US 2012/0036019 A1 Feb. 9, 2012

Related U.S. Application Data

(63) Continuation-in-part of application No. 12/773,384, filed on May 4, 2010, now Pat. No. 8,065,186, which is a continuation of application No. 10/761,987, filed on Jan. 21, 2004, now abandoned.

(51) Int. Cl.
*G06Q 30/02* (2012.01)

(52) U.S. Cl.
CPC ......... *G06Q 30/02* (2013.01); *G06Q 30/0269* (2013.01)

(58) Field of Classification Search
USPC .................................................. 705/14, 16
See application file for complete search history.

(56) References Cited

U.S. PATENT DOCUMENTS

| | | | |
|---|---|---|---|
| 2002/0046099 A1* | 4/2002 | Frengut et al. ................. | 705/14 |
| 2002/0133397 A1* | 9/2002 | Wilkins ......................... | 705/14 |
| 2004/0138953 A1* | 7/2004 | Van Luchene et al. ........ | 705/16 |
| 2006/0041472 A1* | 2/2006 | Lukose et al. ................. | 705/14 |

* cited by examiner

*Primary Examiner* — Afafosman Bilal Ahmed
(74) *Attorney, Agent, or Firm* — Vorys, Sater, Seymour and Pease LLP; Vincent M DeLuca

(57) ABSTRACT

In a system and method for flexibly offering on-line promotions to visitors of a website hosted by a server, when a user signs up with the website, the server collects a plurality of user data from the visitor. If a user's data matches predetermined criteria from an advertiser, then online promotions from this advertiser are included in an opt-in window displayed to the user. In some aspects, a bifurcated client/server scripting approach isolates personally identifiable information until or unless a user opts-into an offer or offers. The server dynamically generates pricing information for each advertiser according to a flexible algorithm. The flexible algorithm depends on the type and quality of user requested by the advertiser.

20 Claims, 20 Drawing Sheets

| | 810 | 812 | 814 | 800 |
|---|---|---|---|---|
| 802 | Adv_1 | Promo_1 | Record of Recipients | |
| 804 | Adv_1 | Promo_2 | Record of Recipients | |
| 806 | Adv_2 | Promo_1 | Record of Recipients | |
| 808 | Adv_3 | Promo_1 | Record of Recipients | |

FIG. 7

| Anonymous user identifier | Offer Identifier 1209 | Offer Identifier | ○○ | Offer Identifier |
|---|---|---|---|---|
| Hashed e-mail 1205 | accepted 1211 | Impressions count 1207 | | |
| Hashed e-mail | | | | accepted |
| Hashed e-mail | | accepted | | |
| Hashed e-mail | accepted | accepted | | accepted |

FIG. 15

| Anonymous user identifier | Advertiser 1 1215 | | Advertiser 2 | | ○○ | Advertiser n | |
|---|---|---|---|---|---|---|---|
| | Data 1 1217 | Data 2 1219 | Data 1 | Data 2 | | Data 1 | Data 2 |
| Hashed e-mail | Data Stored 1213 | | | | | Data Stored | |
| Hashed e-mail | | | Data Stored 1221 | | | | |
| Hashed e-mail | | | | | | | |
| Hashed e-mail | Data Stored | | Data Stored | | | Data Stored | |

FIG. 16

PRIVACY CONSCIOUS QUALIFICATION OF OPT-IN ADVERTISER OPPORTUNITIES

CROSS-REFERENCE TO RELATED APPLICATIONS

This application is a continuation-in-part of U.S. patent application Ser. No. 12/773,384, filed on May 4, 2010, and entitled, "METHOD FOR OPTING INTO ON-LINE PROMOTIONS", which is a continuation of U.S. patent application Ser. No. 10/761,987, filed on Jan. 21, 2004, entitled "METHOD FOR OPTING INTO ON-LINE PROMOTIONS" now abandoned; all applications identified above are incorporated by reference in their entirety herein for all purposes.

BACKGROUND

Field

The present invention relates to on-line advertising and, more specifically, to targeted on-line promotions offered through a computer network.

Related Art

As technology advances and computers become a staple item in every household, the volume of the e-commerce increases significantly. More merchants are moving their businesses to Internet based e-commerce. Consequently, the competition for consumers' attention has become fierce on the Internet and consumers are flooded with advertisements and not-so-welcome pop-up windows that have nothing but advertisements.

The return of these advertisements is generally low, because it is difficult for a merchant to direct an ad to a specific group of consumers. Often the ad is displayed to all consumers who visit a particular website, and these consumers may or may not fit the demographic group in which the merchant is interested. A similar situation happens with an opt-in window with a list of products, where a consumer can select a product about which he would like to receive more information. Generally, an opt-in window with a list of similar products are shown to every consumer who visits a website, whether or not the consumer belongs to a group to which the merchant of a product is targeting.

Besides the advertisements having a low return, merchants are charged at a flat fee that may be dependent on the popularity of a particular website. The fee does not reflect the quality of user data the website collects.

Therefore, there is a need for an option in the advertising system that targets consumers selectively and that charges advertisers based on a measure of success.

SUMMARY

The invention is a system and method that present a customized opt-in window, with selected ads, to a user. In one aspect, an ad promoter receives target information from an advertiser setting forth a set of criteria used to select a user from a plurality of users to receive selected on-line promotions. A web host, under contract with the ad promoter, displays a web page to the plurality of users, and the web page has a plurality of fields for collecting user information. After the users enter user information, the ad promoter receives the user information from each of the plurality of the users and compares the user information from each of the plurality of the users to the set of criteria set forth by the advertiser. For each of the plurality of the users whose user information matches the set of criteria, the ad promoter displayer an on-line promotion from the advertiser in an opt-in window.

Before comparing the user information to the set of criteria from the advertiser, the ad promoter ensures that the user information is valid by checking it against a plurality of sources. If the user information is not valid, the ad promoter asks the user to re-enter the information. The ad promoter will forward the user information that has been validated to the advertiser if the user has opted to receive additional information from the advertiser.

In another aspect, the invention is a method for billing an advertiser for on-line promotions. A web page is displayed to a user. The web page has a plurality of fields for collecting user information. The user information is received from the user. An on-line promotion from an advertiser based on the user information is selected. The selected on-line promotion is displayed to the user. The advertiser is billed in an amount based on at least one objective factor indicative of a success level of the on-line promotion.

In yet another aspect, the invention is a method for billing an advertiser for on-line promotions. A web page to a plurality of users, and the web has a plurality of fields for collecting user information. The user information is received from each of the plurality of users and compared to a set of criteria defined by an advertiser. For each of the plurality of users whose user information matches the set of criteria defined by the advertiser, an on-line promotion from the advertiser is displayed. Besides displaying the, the user information is provided to the advertiser and the advertiser is billed based on at least one objective factor indicative of a success level of the on-line promotion.

In yet another aspect, the invention is a method for presenting customized on-line promotions in an opt-in window. A target information is received from an advertiser setting forth a set of criteria used to select a user from a plurality of users to receive a selected on-line promotion. A web page is displayed to the plurality of users, wherein the web page has a plurality of fields for collecting user information. The user information is received from each of the plurality of users and compared to the set of criteria. For each of the plurality of users whose user information matches the set of criteria, an on-line promotion from the advertiser is displayed in an opt-in window, and the user information is provided to the advertiser. The advertiser is billed for an amount based on the type of user information provided to the advertiser and at least one objective factor indicative of a success level of the on-line promotion.

In yet another aspect, the invention is system for presenting a customized opt-in window to a user. The system has a server connected to a global computer network, and the server includes a network interface in communication with the global computer network. The server also has a controller capable of communicating with the user on the global computer network, a user data validation unit capable of validation the information received from the user including information indicating that the use has opted into at least one on-line promotion, an electronic mail handler capable of sending an confirmation e-mail to a user who has opted in to at least one on-line promotion, a pricing calculator capable of generating pricing information to advertisers whose on-line promotions have been selected by at least one user, and a data storage unit capable of storing the set of advertiser criteria. The controller also selects on-line promotions, according to a set of advertiser criteria, for display in the customized opt-in window communicated to the user. The pricing calculator is capable of generating the pricing information according to at least one objective factor indicative of a success level of the on-line promotions.

In yet another aspect, the invention is a computer-readable medium on which is stored a computer program for presenting a customized opt-in window. The computer program includes instructions which, when executed by a computer, perform the steps of receiving target information from an advertiser, displaying a web page to the plurality of users, receiving user information from each of the plurality of the users, and comparing the user information from each of the plurality of the users to the set of criteria. For each of the plurality of the users whose user information matches the set of criteria, the computer program displays an on-line promotion from the advertiser in an opt-in window. The web page has a plurality of fields for collecting user information. The target information sets forth a set of criteria used to select a user from a plurality of users to receive a selected on-line promotion.

Other advantages and features of the present invention will become apparent after review of the hereinafter set forth Brief Description of the Drawings, Detailed Description of the Invention, and the Claims.

BRIEF DESCRIPTION OF THE DRAWINGS

FIG. 7 depicts a plurality of promotional records.

FIGS. 15 and 16 depict examples of stored data on tangible media according to aspects described;

DETAILED DESCRIPTION OF THE INVENTION

In this description, the terms "advertiser" and "merchants" are used interchangeably, the terms "user" and "consumer" are used interchangeably, and "Global Computer network" includes the Internet. Like numerals refer to like elements throughout the several views. The articles "a" and "the" includes plural references, unless otherwise specified in the description. Although elements of the invention may be described or claimed in the singular, the plural is contemplated unless limitation to the singular is explicitly stated. "Ad" includes advertisement.

The invention provides a way for an ad promoter to provide on-line promotions to selected users through a web host, wherein the users are selected through criteria defined by advertisers whose products are listed in the on-line promotions. Though described as independent entities, the ad promoter and the web host may be a single entity exercising roles herein described for the ad promoter and web host. The on-line promotions include on-line offers of products or services, on-line advertisements, and any other type of promotional ad campaign conducted through a network. The web host collects information from the users who visit a website. The information collected is forwarded to an ad promoter who validates the information and compares it with the criteria defined by the advertisers. If the information from a user matches the criteria defined by an advertiser, the ad promoter selects the on-line promotion from the advertiser to be shown to the user in an opt-in window. If the user opts into with the promotion, the ad promoter collects the user data and sends a confirmation e-mail on behalf of the advertiser to the user. The ad promoter bills the advertiser based on the success rate of the on-line promotions. The ad promoter may also bill the advertiser based on the type of data requested by the advertiser.

Figure 1A:
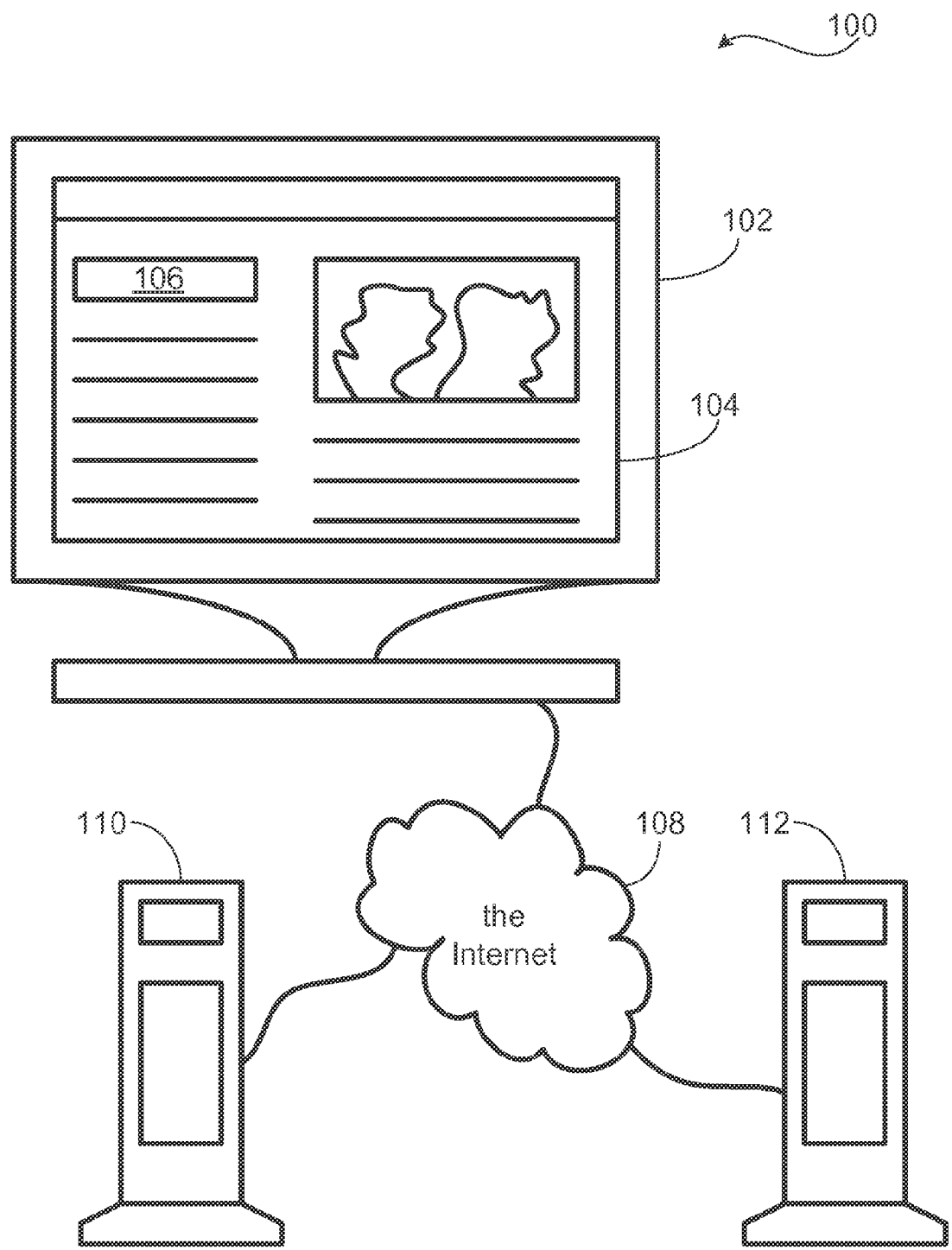
FIG. 1A is a schematic drawing of an information delivery system according to the invention.

FIG. 1A illustrates an architecture of a system 100 that supports one embodiment of the invention. A user uses a computing device with a monitor 102 to access the Internet 108 and to engage in e-commerce. The user visits a website hosted by a web server 110 by entering the website's domain name or its Internet Protocol (IP) address. The web server 110 belongs to a web host and communicates with a promoter server 112 that belongs to an on-line ad promoter. Alternatively, the web server 110 and the promoter server 112 may be combined into one single server. After the user enters the website address, the web server 110 sends a web page to the user's computer, and the web page 104 is displayed on the user's monitor 102. The web page 104 may present a variety of information and services to the user, and the web page may also invite the user to register with the website host through a registration button 106. For example, if the user visits a sports website, the sports website may invite the user to register with the sports website so that the user can receive the latest sport scores through electronic mail (e-mail) messages. If the user accepts the invitation from the website, the website will display a registration screen to the user. The registration screen lists a plurality of data fields where the user can enter personal information.

Figure 1B:
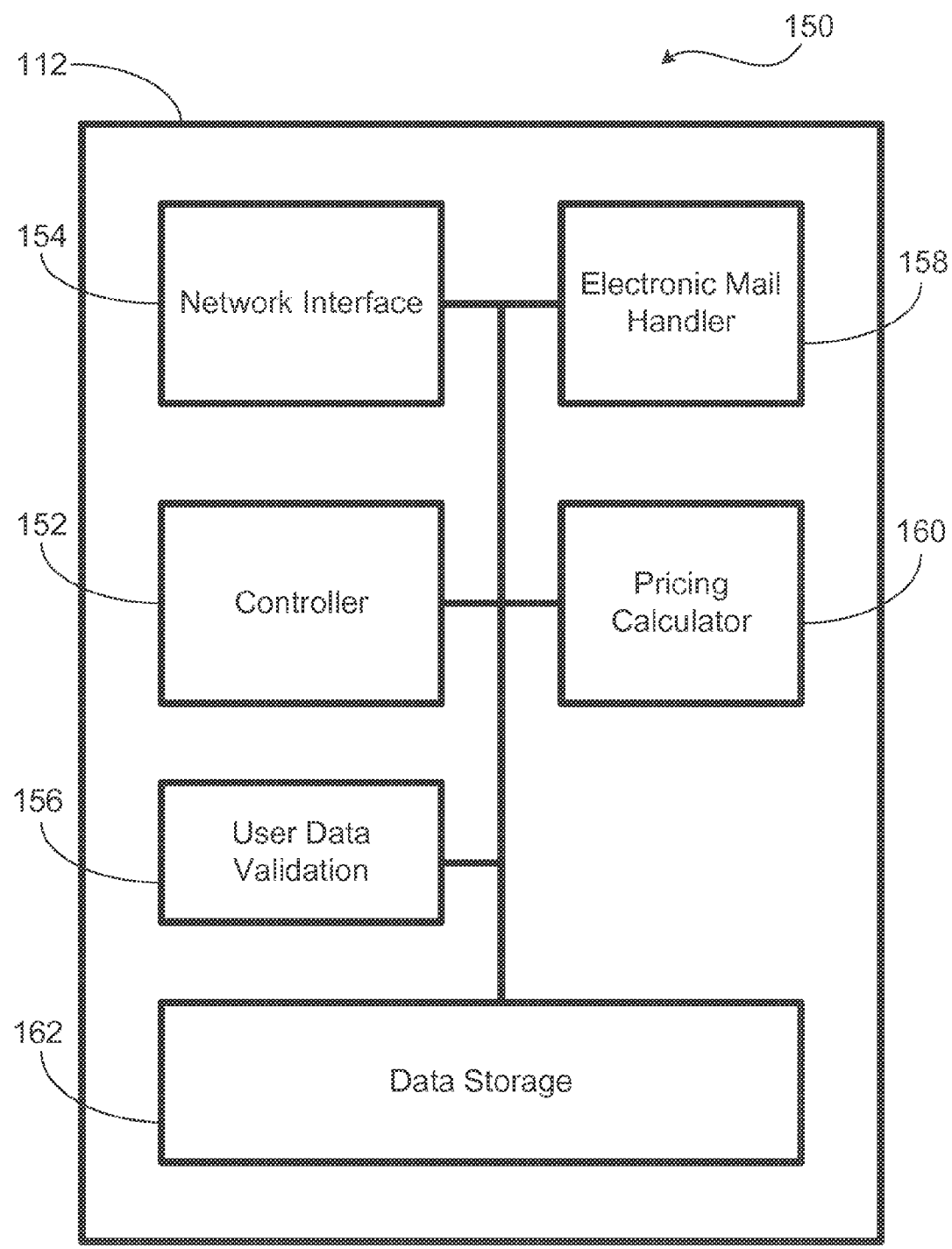
FIG. 1B is a schematic drawing of an architecture of a server according to the invention.

After entering the information, the computing device sends the information to the web server 110, which forwards it to the promoter server 112. FIG. 1B illustrates an architecture 150 of a promoter server 112 supporting the present invention. The promoter server 112, in the form of software or dedicated hardware or a combination thereof, includes a controller 152, a network interface unit 154, a user data validation unit 156, an electronic mail handler 158, a pricing calculator 160, and a data storage unit 162. The promoter server 112 receives the user information from the web server 110 through the network interface unit 154. The controller 152 receives the user information, and sends it to the user data validation unit 156 for validation and formatting. If the information is valid, the controller 152 compares it with a set of criteria provided by a plurality of advertisers. If the information is not valid, the controller 152 may request the user to re-enter the information. An example of an invalid user information may user information with an incorrect ZIP code or an incomplete age field. After comparing the data with the set of criteria, the controller 152 selects from the data storage 162 on-line promotions from those advertisers whose criteria are met by the user information and then displays selected on-line promotions in an opt-in window to the user. The opt-in window may have many different presentations. It may be a window covering the entire display area on a computer screen; it may cover a partial area on the computer screen. It may also be a banner across top or bottom of the computer screen. The opt-in window may list several products with each product being associated with a corresponding check box for the user to indicate a desire for more information about a product.

If the user opts to receive additional information from the selected advertisers, the controller 152 forwards the user information to the selected advertisers and the electronic mail handler 158 sends a confirmation e-mail to the user. The pricing calculator 160 calculates a fee to be billed to the advertisers for the on-line promotions and for the user information.

Figure 2:
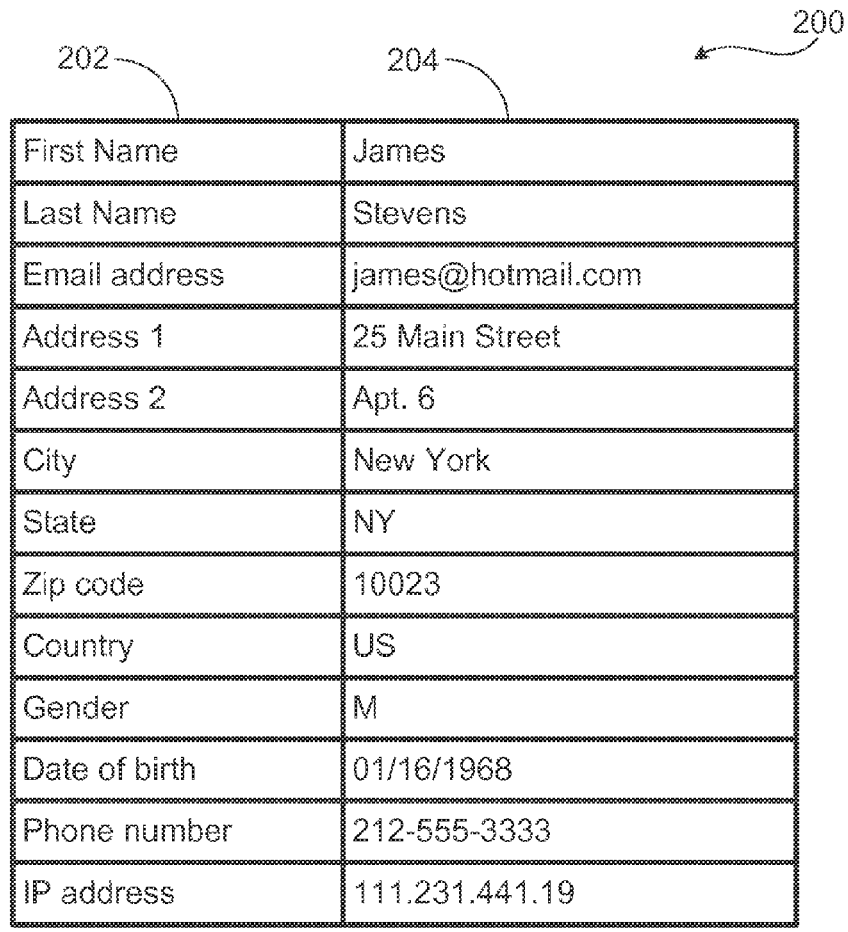
FIG. 2 is a collection of user information according to one embodiment of the invention.

FIG. 2 is a list of typical user data 200 that may be collected from the user. The list may be enlarged to include specific user information that may of interest to merchants. For example, a merchant may be interested to learn the ethnic group to which the user belongs or the family income that the user has. Not all data are necessarily entered by the user. For example, the IP address might be extracted from a data packet sent from the user's computer after the user clicks a "SUBMIT" button.

After the user data 200 are collected, they are validated. The validation may be performed by the promoter server 112. However, validation may also be performed by the web server 110 or a third party service provider's server. If the promoter server 112 is doing the validation, the promoter server 112 checks for typographical errors or invalid data. For example, if a user enters a joke name, such as "Guess Who," as his name, when the name is checked against a database of illegal names it will be flagged as invalid. Besides checking for invalid names, the promoter server 112 also checks for the validity of e-mail addresses. The promoter server 112 may check the format of an e-mail address and the validity of the domain name of the e-mail address. For example, if the user provides lames@xyz.net" as his e-mail address, the promoter server 112 will detect that the e-mail is invalid for not having "@" separator. After prompting the user to correct the e-mail entry, the server checks "xyz.net" against a database of domain names. The validity of an e-mail domain, such as xyz.net, can also be checked by "pinging" the destination domain. The promoter server 112 may also check the validity of an email address by sending a test e-mail to the e-mail address. If the e-mail bounces back, the email address will be marked as invalid. An e-mail bounces when it is undelivered and returned to the sender with an error message.

The correctness of the user's address may also be checked against an address database, such as the address database of the U.S. postal service. If the user provides a ZIP code of a city in Illinois and lists Georgia as his state, the promoter server 112 will flag it as invalid address. The promoter server 112 may also validate the telephone number provided against a subscriber database from a telephone service provider. The promoter server 112 may also cross-check the address with the address information associated with the telephone number. If the address associated with the home telephone number is in New Jersey and the home address provided is in New York, then the both the telephone number and the address are marked as invalid.

Certain missing address information may also be complemented or corrected. For example, if the user failed to provide his city and state, but provided the ZIP code, the promoter server could be able to complement the address information by retrieving the city and state name from an address database using the ZIP code. Similarly, if the user provided his street address with exception of the ZIP code, the promoter server may be able to find and fill in the ZIP code using the address database.

The date of birth is also checked. If the user enters the date in the format of dd/mm/yyyy instead of mm/dd/yyyy and enters 25/02 the promoter server 112 will detect "25" as an invalid month and request the user to re-enter the data. The promoter server 112 may also compute the user's age and check it for validity. If the user enters 2000 as year of birth, the promoter server 112 will prompt the user to change it if it does not expect or accept a three year old child as a user. Similarly, if the user enters 1850 as the year of birth, the promoter server 112 will flag it as invalid year and request the user to re-enter the data.

In addition to validating the user data, the promoter server 112 also formats the user data to conform a pre-determined standard. For example, the user may enter "Georgia" as the state of residency, and the server will change it to "GA"; if the user has entered "new york" as the city, the server will change it to "New York." The formatted user data can then be easily used by other applications.

Figure 3:
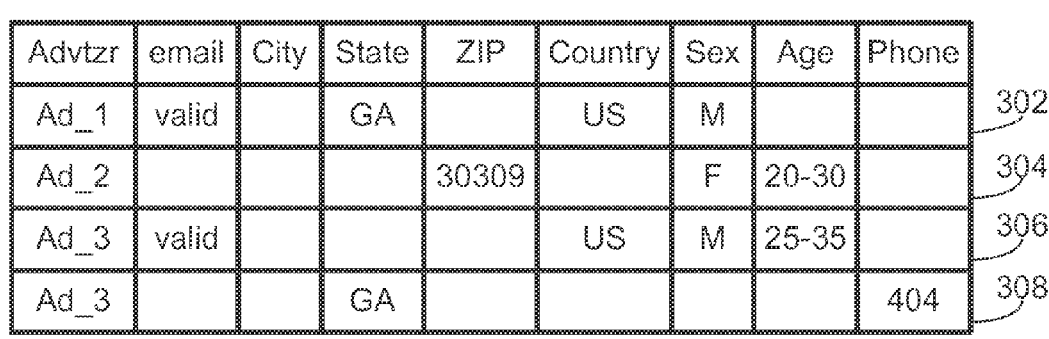
FIG. 3 is a set of advertiser criteria.

After validating the user data, the promoter server 112 compares the user data with criteria from a plurality of advertisers. Each advertiser may either set up its own criteria through a web page interface or provide its criteria to the ad promoter for entry into the ad promoter's system. The web page for setting up advertiser criteria may include a plurality of fields, where each field refers to a user characteristic. If the user data matches the criteria from one or more advertisers, ads from these advertisers will be included in an opt-in window and displayed to the user. FIG. 3 is an example of a criteria table 300. There are a plurality of entries in the criteria table 300, one per each advertiser or one per each ad. Each advertiser may list one or more ads in the criteria table 300. Each ad has a set of criteria that must be satisfied before the ad is included in the opt-in window. For example, an advertiser may target Ad_1 302 to users who have a valid e-mail address, live in state of Georgia in the U.S., and who are male. The same advertiser may have another ad designed for a different age range but not limited to a specific state as shown in entry 306. In this entry, the ad is addressed to males, between 25 and 35 years old, in the U.S. and who have a valid e-mail address. Another ad 304 from a regional advertiser focuses only on females between 20 and 30 years of age who live in the region covered by ZIP code. Finally, an advertiser that relies more on direct telephone marketing might be more interested in people living in the state of Georgia who have a telephone number with the area code of 404 as is reflected by Ad_3 308. The criteria table 300 does not necessarily show all data collected from users and may be expanded to cover other data.

Figure 4:
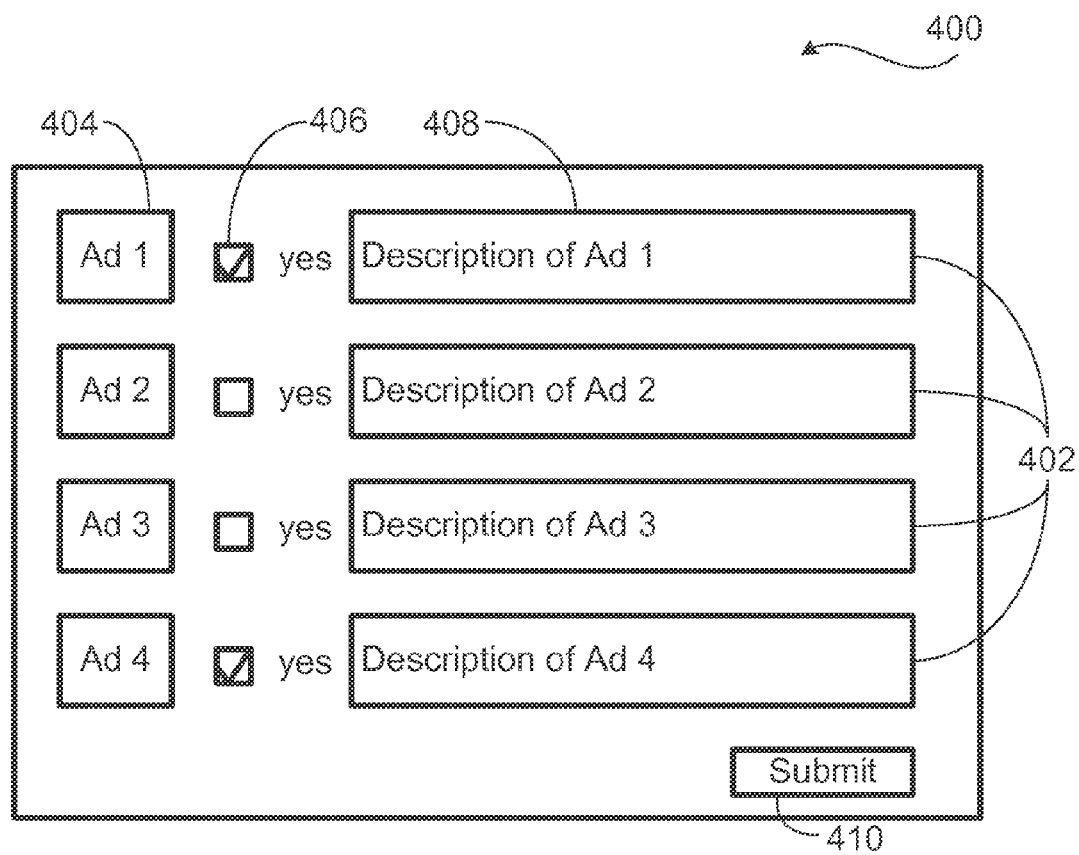
FIG. 4 is an opt-in window according to one embodiment of the invention.

FIG. 4 is depicts an opt-in window with a plurality of entries 402. Each entry 402 has an ad 404, an opt-in box 406, and an ad description 408. The ad 404 may be a picture of a product, a logo, or other advertiser identification mark. The ad description 408 provides a brief description of a product or a promotion. If the user wants to receive additional information about the product or promotion, he checks the opt-in box 406. The user may check one or more opt-in boxes. After checking the appropriate opt-in boxes, the user clicks the submit button 410 to submit his choices.

Figure 5:
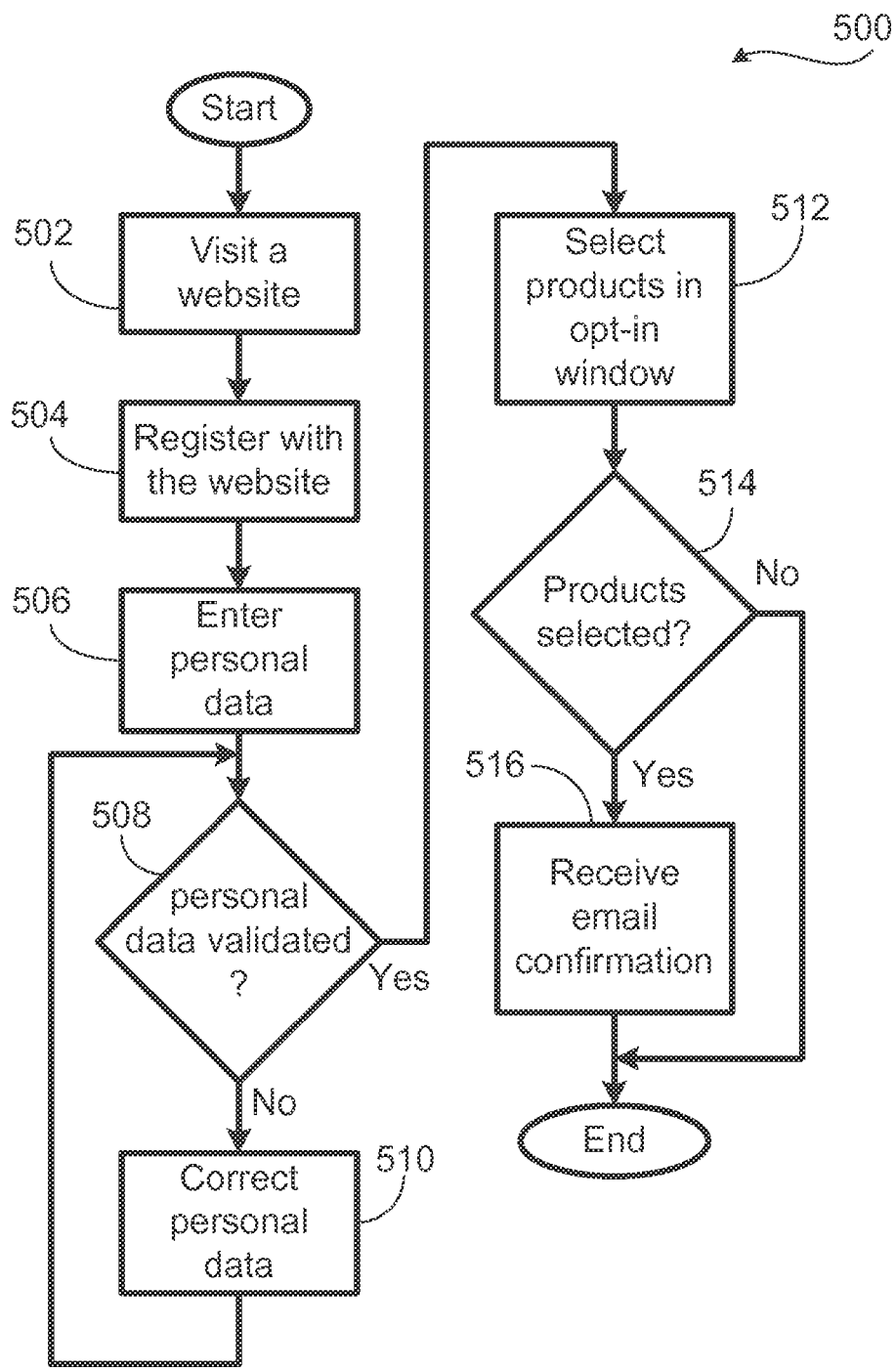
FIG. 5 is a flow chart for a user process.

FIG. 5 is a flow chart for a user process 500. The user visits a website hosted by a web server, step 502, and browses the information on that website. The website may entice the user to register himself with the website through a free offer. If the user enjoys the website, or likes the free offer, he may register with the website, step 504. A screen with a list of input fields will be displayed to the user, where he can enter his personal data, step 506. The list of personal data depends on the nature of personal data that the website wants to capture. After receiving the data from the user, the web server sends the data to a promoter server for validation. The validation includes checking for spelling errors and comparing the data against different databases, step 508. If there is any error or invalid data, the web server prompts the user to enter the correct data, step 510.

After the data is validated, the promoter server formats the data to a standard format. Subsequently, the promoter server compares the user data against a set of criteria from a plurality of advertisers. For the criteria that the user data matches, the promoter server selects the products from these advertisers and assembles them in an opt-in window, step 512. The opt-in window, with a list of selected products, is then displayed to the user.

After viewing the opt-in window with a list of products, the user may be attracted to request further information on these products, and the user can request more information by checking the opt-in box listed beside the product. The opt-in window will go away after the user clicks the "Submit" button or closes the opt-in window manually. After the opt-in window is closed, the promoter server checks whether the user has opted to receive additional information on any product, step 514. For each product selected by the user, the promoter server will send a confirmation e-mail, step 516, to the user on behalf of the advertisers thanking the user for the request. In addition to sending a confirmation e-mail to the user, the promoter server will also send the user information and the user request to the advertiser.

Figure 6:
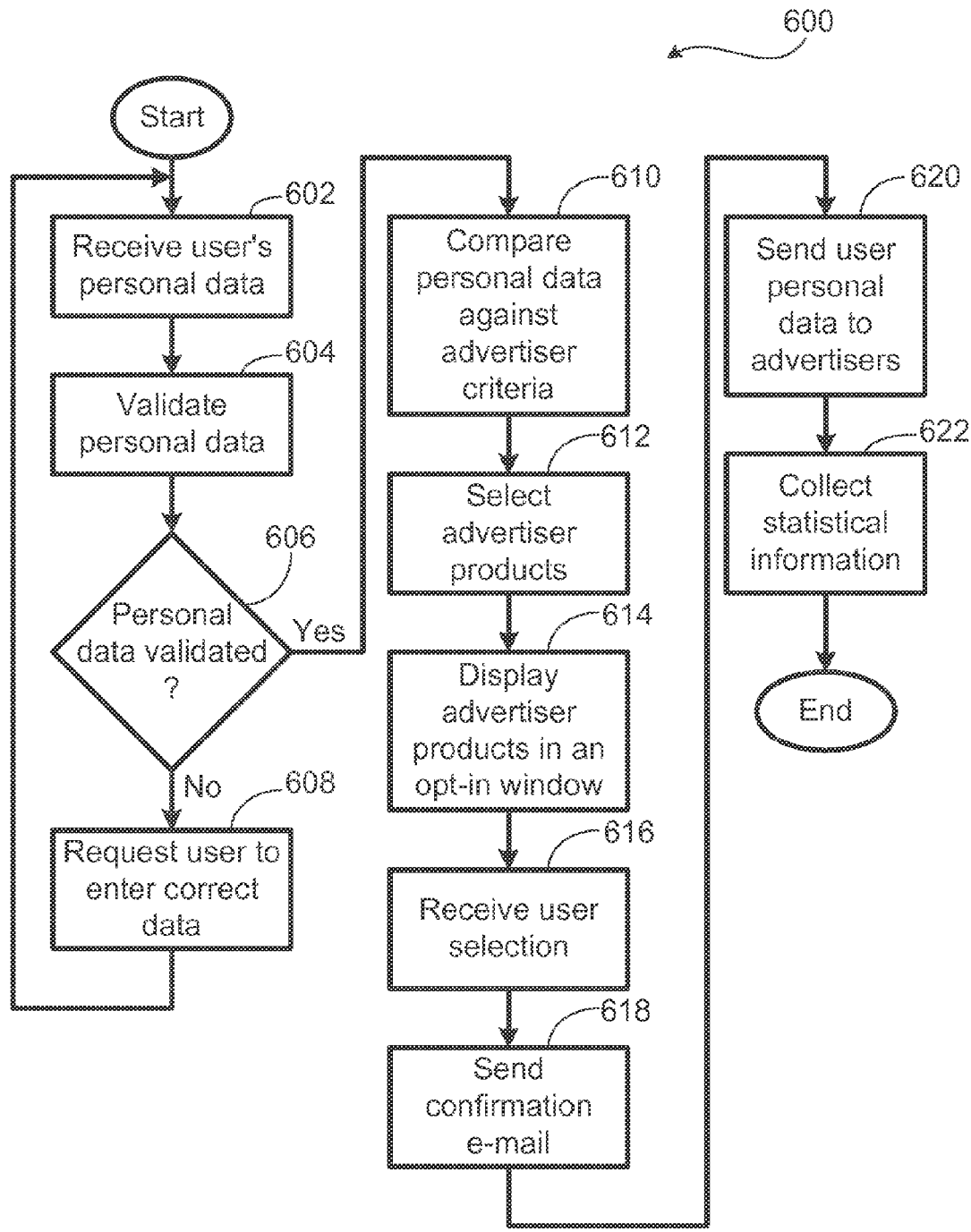
FIG. 6 is a flow chart for a server process.

FIG. 6 is a flow chart depicting a combined server process 600. The web server displays a website for a merchant, which presents many different offers of products and services. When the user decides to receive additional information from the merchant, the user provides his personal information to the web server. The web server receives the user's personal data, step 602, and forwards the data to a promoter server for validation, step 604. In one emboidment, .the user could have provided his personal information to the web server on a prior occasion as part of a registering process with the web server, and only now the user's personal information is passed to the promoter server as part of a promotional campaign. The same user information may be passed to the promoter server for different promotional campaigns.

After receiving the user personal data, the prmoter server validates it by comparing it to a plurality of databases. If the personal data is not valid, the web server prompts the user to re-enter his information, step 608. Otherwise, the promoter server compares the user's data to criteria from a plurality of advertisers, step 610. For the advertisers whose criteria fit the user's data, their products are selected, step 612, and displayed to the user in an opt-in window, step 614. After the user selects which products he would like to receive more information about, the promoter server receives the user's selection, step 616, and sends a confirmation e-mail, step 618, to the user on behalf of the advertisers. Additionally, the prmoter server sends the user's data to the advertisers whose products the user has selected, step 620, and collects statistical information related to the user data, step 622. Although, the description above refers to a web server and a promoter server, the description is also applicable when the functions are hosted by one single server.

Besides sending the user data to the advertisers, the promoter server may also save them in a promotional record. The promotional record may store a list of users whose information have been sent to the advertisers and their personal information. FIG. 7 illustrates a plurality of promotional records 800 in a database. For each promotional record, the promoter server saves the advertiser's identification 810, the promotion's identification 814, and a record of recipients 814. The record of recipients includes the list of users to whom a promotion has been shown and the personal data for these users. Each advertiser may have multiple entries, one for each promotion. For example, if advertiser 1 has conducted two promotional campaigns, then there will be two entries, 802 and 804. These records are particularly useful when a repeat user does not provide his full personal information on his subsequent visits.

Figure 8:
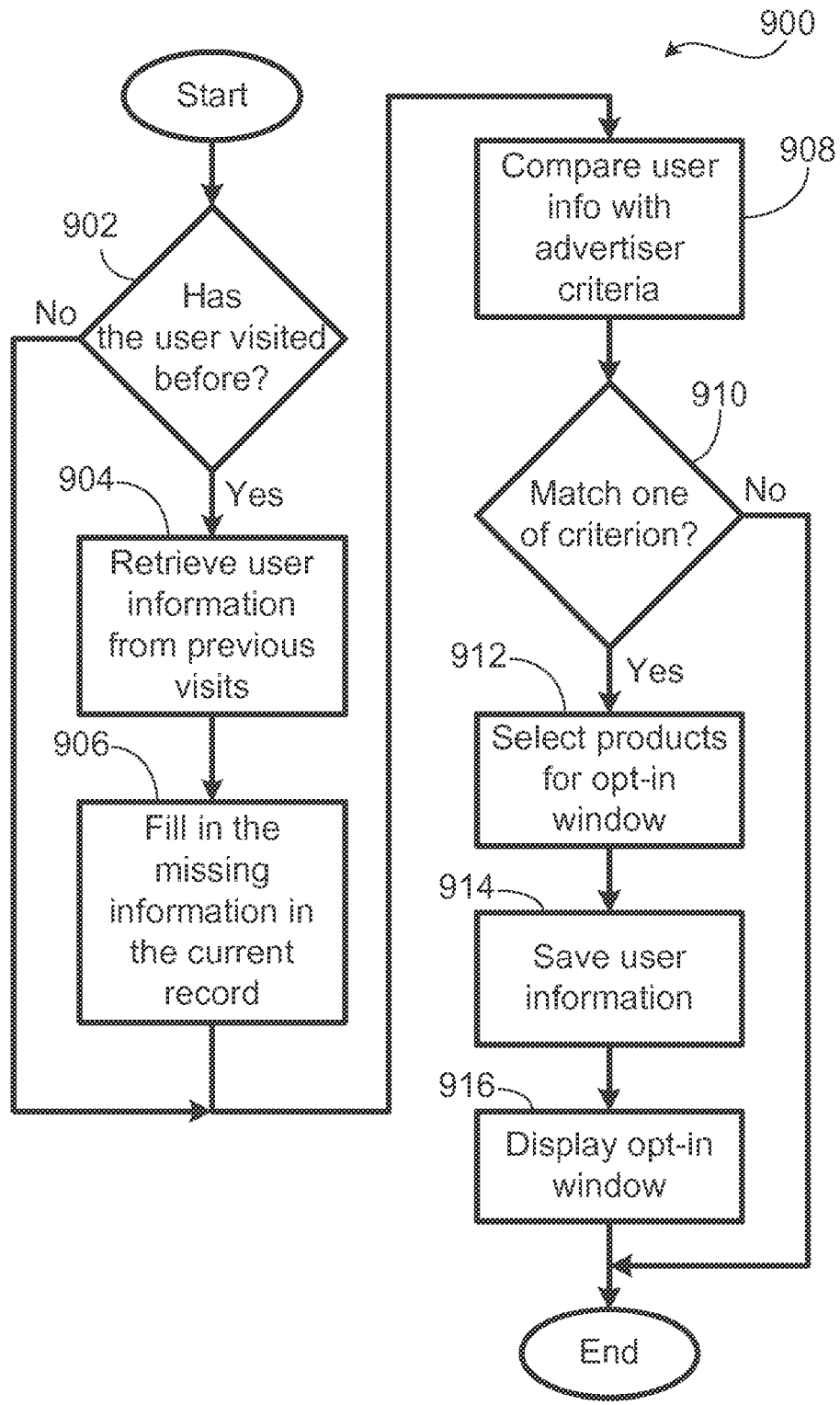
FIG. 8 is a flow chart for a server process with a data roll up feature.

FIG. 8 is a flow chart 900 for a data roll up feature. The data roll up feature allows the promoter server to supplement a user information provided by the web server with data from the user's previous visit. This feature is particularly useful when a repeat user fails to provide all his personal information. When the promoter server receives an incomplete user information from the web server, the promoter server checks whether the user is a repeat user, step 902. The promoter server may be able to check whether the user is a repeat user by using the information received from the web server. For example, if the user has provided his e-mail address, the promoter server may check whether such e-mail address is in one of the promotion records for in the database. The promoter server may also identify the user by his telephone number or his name. If the user is a repeat user, the promoter server retrieves the missing information from the record of his prior visit, step 904. If the user has visited more than once before, the promoter server may be able to compose the missing data from several records related to his prior visits. The information retrieved from the past visits is used to fill in the record of his current visit, step 906. For example, if the user failed to provide his sex and his age, the promoter server may be able to identify the user through his e-mail and retrieve his sex and age from records of his prior visits.

After filling in the missing information, the promoter server compares the user information with advertiser criteria, step 908. If the user information matches one criterion from one advertiser, step 910, the promoter server selects and includes products from that advertiser into an opt-in window, step 912. The promoter server may save either the user information as received from the web server or the updated user information, step 914. Finally, the promoter server displays the opt-in window to the user, step 916, and sends the user information to the advertiser. The promoter server sends the updated user information to the advertiser if the information retrieved from the previous records is needed for the advertiser to communicate with the user.

If the user information received from the web server is incomplete and the user is not a repeat user, the promoter server may process the user information normally by comparing the available information with advertiser criteria. If the missing user information is not one of criteria data from the advertiser, the promoter server may display an opt-in window to the user if the user information as provided satisfies the advertiser criteria.

Figure 9:
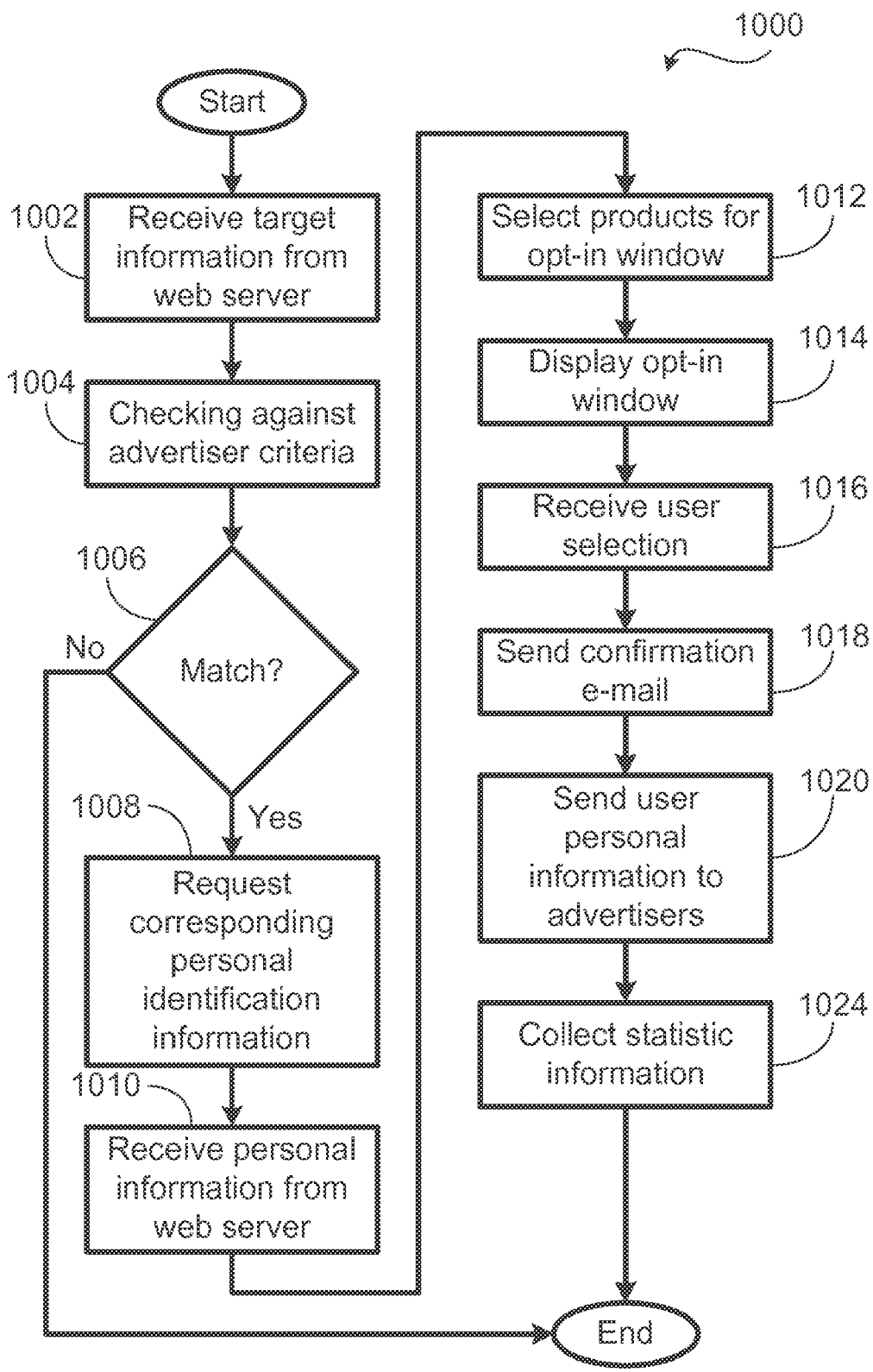
FIG. 9 is a flow chart for a server process with a privacy feature.

FIG. 9 is a flow chart of a promoter server process with a privacy feature. When privacy is of concern, a web server may not want to release a user's personal information when it is possible that the user may not meet an advertiser's criteria. In this situation, the web server passes only a target information that is necessary for the advertiser criteria comparison purpose. The target information is information used by advertisers to select their target groups and may include sex, age, ZIP code, area code, etc. The promoter server receives the target information from the web server, step and checks the target information against the advertiser criteria, step If the target information matches the advertiser criteria, step the promoter server then request user's personal information, step After receiving the personal information from the web server, step the promoter server selects products for the opt-in window, step and displays the opt-in window, step The steps 1024 are similar to those described for steps 616-622 in FIG. 6. If the target information does not match the advertiser criteria, then there is no need to receive the rest of user information. In an alternative embodiment, the promoter server may request user's personal information if the user has opted in to receive additional information from the advertiser. If the user has seen the opt-in window but has not opted to receive additional information from the advertiser, then there is no need to request additional user information from the web server.

In an alternative embodiment, certain missing information may be replaced with statistical census data. For example, if the information received from the web server does not include family income and the family income is part of advertiser criteria, the promoter server may use user's ZIP code to retrieve the average income of people living in the area where the user resides and assigns this average income to user for the purpose of checking whether the user qualifies for the advertiser criteria. For example, if the user did not input his family income and the average income in the neighborhood where he lives is $100,000.00 according to the data from the Census Bureau, the promoter may use $100,000.00 as his income when comparing his information against the advertiser criteria. Similar assignment of statistical data can be done for age, sex, number of children, marital status, ethnic background, etc. The promoter server may provide these statistical data to the advertiser indicating that these are assigned data instead of actual data.

The promoter server bills each advertiser according to a flexible pricing algorithm.

The following is one example of a flexible pricing algorithm. The variables and constants can be added, deleted, or changed according to business needs.

$$X=(Yn \text{ based on existing, valid criteria required and passed})-((Z-A)\times(Y\times100))-((C-B)\times((Y\times100)\times1.25))-((D-E)\times((Y\times100)\times1.25))-((F-G)\times((Y\times100)\times1.25))+(H+I+J)$$

Where:

X is the final bounty assigned to an offer charged to an advertiser, on a specific page, to a specific consumer coming through, with the specific valid information being passed; X may not be greater than Y;

is the maximum bounty set by the advertiser for a specific set of criteria. E.g., demographic, geographic and datagraphic (fields of data passed). There may be more than one Y set for each offer (e.g. Y1, Y2, Yn). For instance Y1=$0.50 for first name, last name, e-mail, ZIP code, female.

Y2=$0.30 e-mail, female. Y3=$0.20 e-mail. Etc.;

Z is the average unique opt-in rate on the page for the past 5 days. Unique opt-in rate is the number of people that opt-in to at least 1 offer. (e.g .22 or 22%);

A is the average unique opt-in rate on the entire network for the past 5 days. Unique opt-in rate is the number of people that opt-in to at least 1 offer. (e.g .20 or 20%);

C is the average opt-in rate of similar offers on the page for the past 5 days;

B is the average opt-in rate of similar offers on the entire network for the past 5 days;

E is the average confirmation e-mail open rate of all offers on the page over the last 5 days;

D is the average confirmation e-mail open rate of all offers on the network over the last 5 days;

F is the average confirmation e-mail open rate of all offers on the network over the last 15 days where the data passed in, data left after validation and data collected are the same. (e.g. First, Last & E-mail were passed, Email was good but First and Last Names were not good and E-mail was collected.);

G is the average confirmation e-mail open rate of all offers on the page over the last 15 days where the data passed in, data left after validation and data collected are the same;

H is a 0 or negative based on the placement of page (Static);

I is a 0 or negative based on the layout of offers (Static);

J is a 0 or negative based on the type of website (Static).

A flexible pricing algorithm, such as above, allows an advertiser to specify the price he is willing to pay for each piece of information and the actual price paid depends on the type of information provided by a website. For example, the advertiser may be willing to pay a maximum bounty (Y) of 10 cents for a valid e-mail address, 20 cents for a valid e-mail address plus a corresponding physical address, or 30 cents for a valid e-mail address plus a physical address and a telephone number. The actual, final bounty (X) paid by the advertiser will not be greater than the maximum bounty (Y). The actual final bounty (X) is calculated by adjusting the maximum bounty (Y) according to various performance factors unique to the website where the user data is collected. The advertiser may pay more for data collected from a high traffic website or a website that consistently visitors who provide verifiable data. Conversely, the advertiser may pay less for data collected from a "low traffic" website.

The factors that affect the pricing algorithm are adjusted dynamically based on a website's performance. For example, an increase in the opt-in rate, which will be explained in more detail later on, in last 5 days would improve the website's performance, and may result in an increase in the bounty paid by an advertiser. An increase in confirmation e-mail open rate would also improve the website's performance and affect positively on the bounty paid by the advertiser.

The flexible pricing algorithm allows dynamic calculation of a bounty for each ad shown to each user. The algorithm is adjusted according to historical data that may be adjusted frequently. The historical data include, but are not limited to, the opt-in rate on the network, the opt-in rate of similar offers, the confirmation e-mail open rate on the network, the confirmation e-mail opent rate of similar offers, etc. The opt-in rate is a rate of users "clicking" or "checking" at least one offer in an opt-in window. The confirmation e-mail open rate is a rate of users opening the confirmation e-mails. A network rate refers to the rate calculated based on all the websites controlled by a promoter.

The pricing algorithm is flexible because it depends and reflects on the quality of data collected. The quality of data depends on many factors and can be enhanced by certain approaches. For example, if a confirmation e-mail that was sent to an opt-in user bounced, the e-mail address would not be collected. Similarly, if a user immediately unsubscribes to any future e-mails upon receiving the confirmation e-mail, this user's e-mail would not be collected either. On the other hand, if a confirmation e-mail is opened by the user, then the user's e-mail would have a high value because it belongs to an active user. The opening of a confirmation e-mail can be detected either by a return receipt attached to the e-mail or a notice from a website when the e-mail is in a hyper-text markup language (HTML) format.

The quality of the data collected also depends on the quality of information on the website visited by users. A web server that consistently provides visitors with useful information or attractive offers is likely to collect good data from its visitors and should be rewarded accordingly. One way to reward a web server adequately is to pay it based the data collected or the percentage of opt-in generated. Thus, a web sever will be paid more if it manages to get more opt-ins from its visitors.

The following describes an exemplary scenario of the invention. An ad promoter solicits ad business from several advertisers by allowing advertisers to target their ads to a specific demographical group. For example, an advertiser may be interested only in women between 35 and 45 years of age, married with children. The advertiser will pay $0.50 for each telephone number for users meeting this criteria. The ad promoter then contracts with several web servers who host websites most likely to be visited by this specific group of users.

When a user with these qualifications visits a website for a woman's magazine, for example, she will see an invitation to join the magazine's e-mail list for receiving free coupons. She registers with the magazine's website and provides her personal data, such as age, e-mail address, telephone number, home address, marital status, number of children, etc. The web server for the woman's magazine forwards a copy of this data to a promoter server for validation.

The promoter server checks the user's personal information. For example, the telephone number may be checked through a reverse white page service provided by a third party. If the telephone number is valid, the reverse white page service returns the telephone number with an address, which will be checked against the home address. If they match, the promoter knows that the telephone number and the home address are good.

After checking the personal information, the promoter server compares the information with criteria from the advertiser. If a user is a woman who is 40 years old, married with 2 children, then she matches the advertiser's criteria. The promoter server will then assemble an opt-in window with the advertiser's special promotion and display the opt-in window to the user.

If the user is interested in the special promotion and wants to learn more about the product, she checks the opt-in box and submits her request. The promoter server sees that the user has opted in to receive additional information and then sends a confirmation e-mail to the user on behalf of the advertiser thanking her for the request. The promoter server will also collect the user's telephone number and send it to the advertiser.

The promoter calculates a fee that will be charged to the advertiser for the service of displaying the promotion and providing a good telephone number. The promoter also pays the web server for the woman's personal information.

Figure 10:
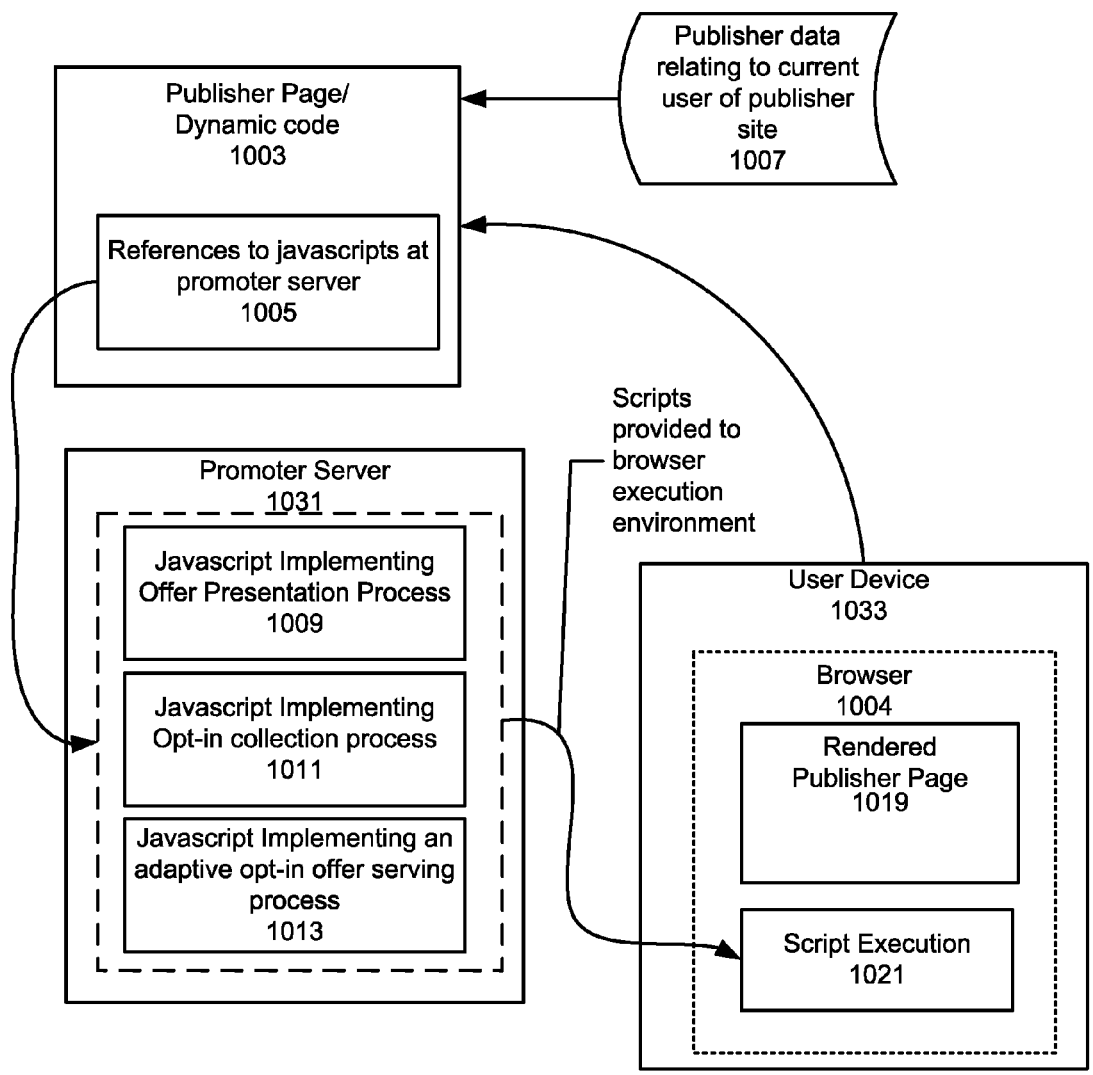
FIG. 10 depicts a publisher page, a promoter server and a user device that provide context for examples that follow.

FIG. 10 depicts a publisher page 1003, which includes a reference or references 1005 to a script (e.g., JavaScript) located at a promoter server 1006. The publisher page 1003 can include data 1007 that the publisher can provide from its records. Such data 1007 would be related to a profile of a user that is browsing the page from a user device 1033, and can use a browser 1004 for that purpose. Browser 1004 is shown as having a rendered publisher page 1019, comprising markup from page 1003. Browser 1004 also would execute the reference script(s) in a scr3ipt execution environment 1021. Examples of scripts from promoter server 1031 include a script implementing an offer presentation process 1009, a script implementing an opt-in collection process, and a script used in implementing an adaptive offer selection and serving process 1013. Not all such scripts would necessarily be running at any given time on device 1033, and not all scripts may be available in all implementations, as described in further detail below.

Figure 11:
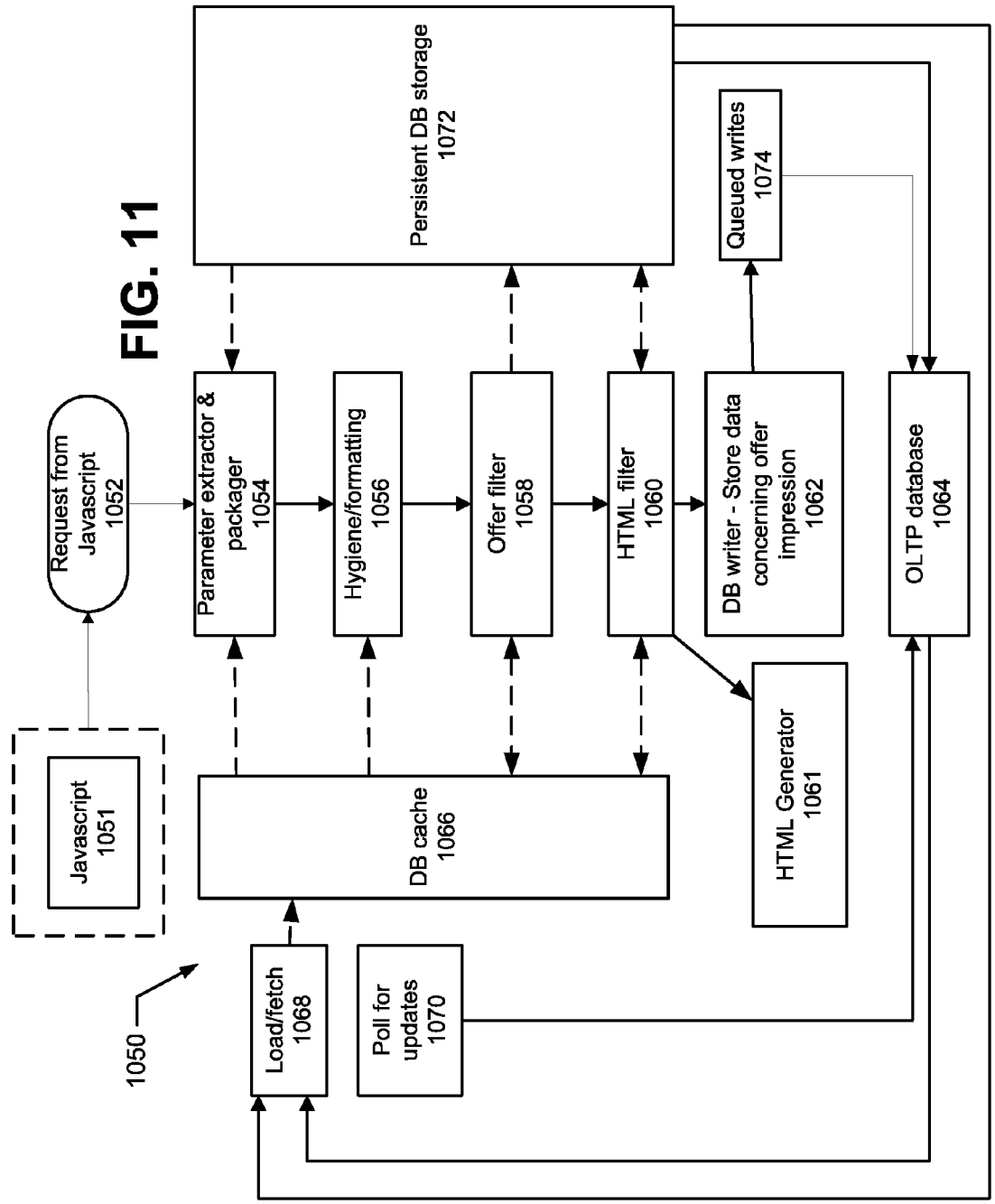
FIG. 11 depicts an example information gathering scripting approach.

FIG. 11 depicts example components of a system 1050 for presenting opt-in offers on a page being browsed on a user device (as in FIG. 10). JavaScript 1051 is an example of a script executing on client device, and which was referenced by the publisher page being viewed by the user. JavaScript 1051 obtains information from one or more of the publisher page content and the user, such as during an account setup process. Such information can include demographic information. JavaScript 1051 generates a request which includes at least some portion of the obtained information. A parameter extractor function 1054 parses the request. A formatter 1056 can canonicalize or otherwise put the parsed information into a desired format. An offer filter 1058 uses the information from the request to determine offers that are not ruled out by the information known about the user and can output a list of potential offers to be presented. Then, an HTML filter can filter this list based on information from DB cache 1066, which can include information about offers that have been accepted by the user (further description concerning how the user can be identified is provided below). An HTML generator 1061 can then receive the offer information that remains and create a markup page representative of those offers and return it for display within the publisher page, such as a frame or other window portion made available for that purpose. Information about the offers made available for this particular opportunity (e.g., information about the user, the publisher site, date and time information). These writes can be queued for asynchronous writing to the DB 1064. This information also can be stored in DB cache 1066 and persistent storage 1072. Persistent storage is in an example, a second tier of storage between dynamic cache 1066 and database 1064. This example takes the database 1064 out of the real time transaction loop. but also provides a durable transaction mechanism.

Figure 12:
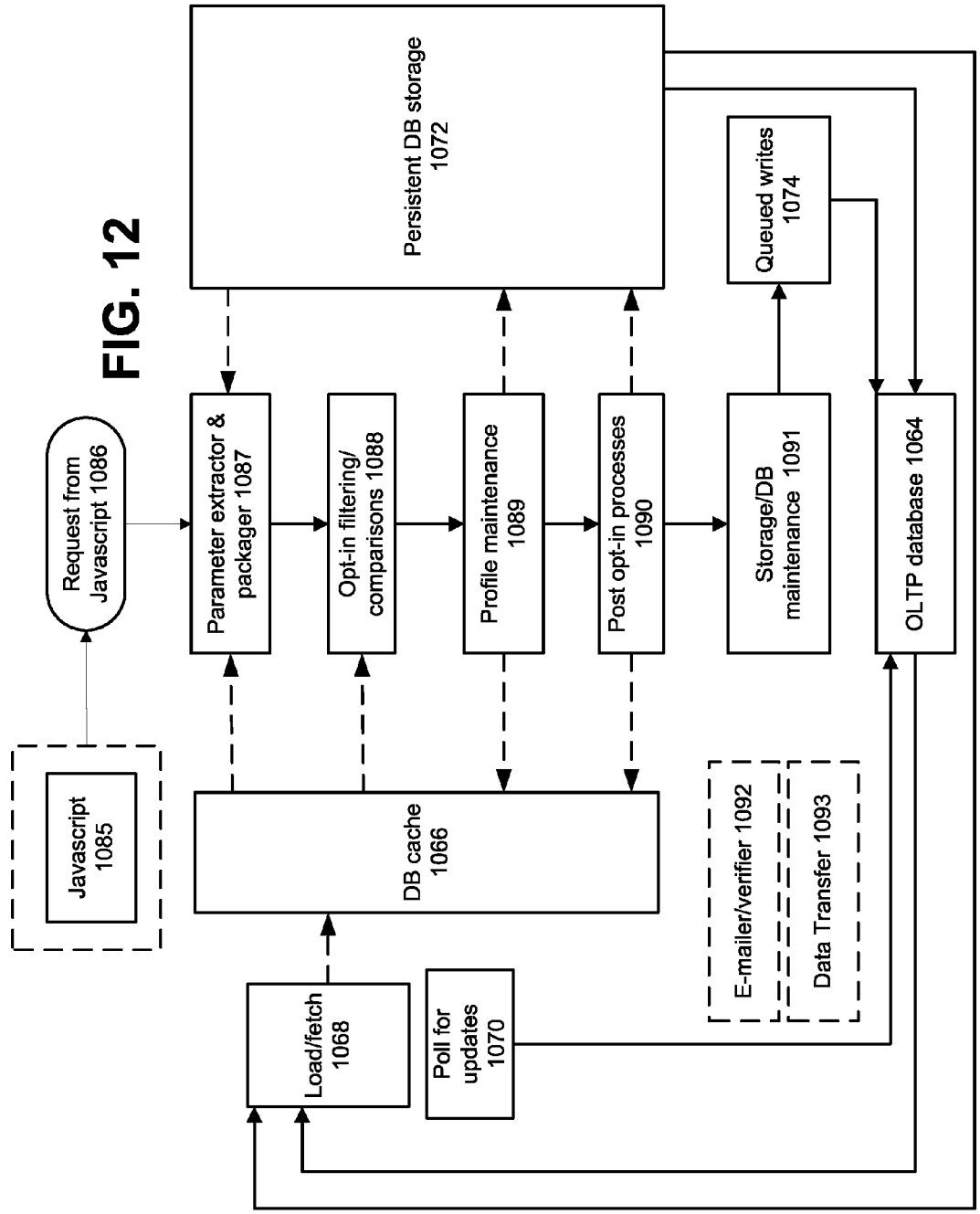
FIG. 12 depicts an example of functional components for processing of opt-in information.

FIG. 12 depicts an example of an opt-in processing system. Some of the components are similar to that of FIG. 11, and need not be described again. A JavaScript 1085 submits a request 1086 that includes information obtained from a user filling out a form requesting specified information, such as personally identifying information and demographic information (note: as will be described below, personally identifiable information can be treated using a privacy conscious technique, but is referred to generically here). Opt-in filtering and comparisons 1088 can be used to check the data submitted, potentially perform corrections or formatting, and output data to be used in profile maintenance 1089. Such maintenance 1089 can include updating records that track which offers have been accepted by a given user (see FIGS. 15 and 16). Post opt-in processes 1090 can be performed, examples of which include e-mail verification/confirmation 1092, and data transfer 1093 functionality. verification and confirmation also can involve checking databases to complete or validate information that was submitted. Outputs of such confirmation, completion and validation can be stored in DB storage 1072 and/or database 1064. Data transfer 1093 operates to transfer data gathered for a particular offer to the advertiser that commissioned the offer.

Figure 13:
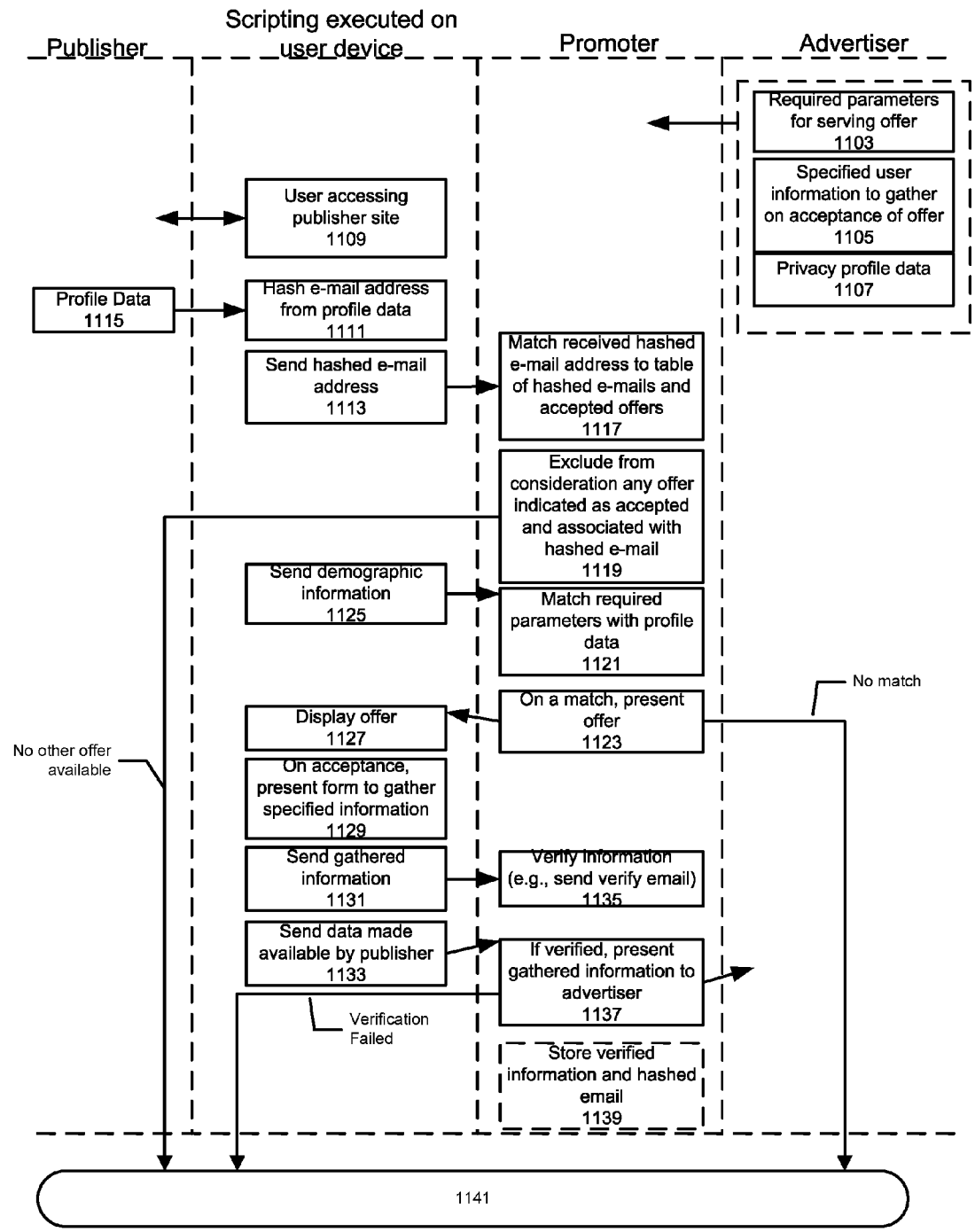
FIG. 13 depicts an information flow among the entities depicted in FIG. 11.

A more particular example of functionality according to certain aspects is found in FIG. 13. FIG. 13 depicts that an advertiser (the term advertiser is used in that it is a familiar term; however, because in many aspects, this system deals with opt-in offers, rather than advertisements, paying customers or subscribers of the system may also be advertisers, in that they pay for advertisements to be displayed in Internet settings. However, customers of implementations of the disclosed opt-in advertising systems need not be advertisers). An advertiser provides required parameters for serving an offer 1103, and specified information to be gathered from a qualified user that accepts the offer 1105. Privacy policy and data use information also can be provided. A candidate user is accessing 1100 content from a publisher. The publisher has referenced a script provided by promoter that is downloaded to the device from which the user is accessing the publisher content. The publisher, when generating the content being viewed can store portions of information about the user within the page content. This information is accessed by the script. In one example, the information includes an e-mail address of the user, which was provided by the user to the publisher. The script executing on the client device hashes 1111 at least a portion of the e-mail address (e.g., the username portion of the e-mail address, but not the domain). The hash is preferably a one-way hash, such that the original information is difficult to recover. The hash preferably also has the property that collisions are infrequent. A strength of hash can be selected based on the size of the system (e.g., if tens of millions of e-mail addresses may be stored, then a stronger hash may be used that is less likely to have a collision. This hashed e-mail address is sent 1113 to the promoter. The promoter compares the hashed e-mail address with records that contain previous interaction information between the user associated with that hashed e-mail address, and opt-in offers. Examples of such databases are shown in FIG. 15 and FIG. 16, below. An e-mail address is one example of personally identifiable information that can be used as a key to check databases of interaction history. However, other personally identifiable information can be hashed and used in addition or substitution.

The script also can send 1025 demographic information obtained from publisher, or as entered by the user. The demographic information is used to match opt-in offers 1121. A list of offers that match, and which have other properties, as desired, such as having not been previously accepted, or which have not been previously presented, for example, are assembled. The offer(s) assembled are presented 1123. If there is no match, then the method can terminate. However, a default offer or offers also can be presented. The user device displays 1127 the list of offers. The user can interact with the form that displays the offers, and can accept one or more of the offers. Upon receiving at the client device an indication of acceptance, the JavaScript on the client device can display a set of fields for gathering the information specified by the advertiser associated with that offer (see 1105). The JavaScript that performs this portion can be loaded with the presented offers, such that the promoter does not need to provide the fields upon user acceptance. The fields are used to gather the information, and the JavaScript sends the information to the promoter. The informatino can be verified 1135. Verification can include sending confirmatory e-mails, or accessing databases or other sources of information to verify correctness, or assign a probability that the information is complete or correct. If the verification failed, then the information may not be stored. However, in some implementations, an adaptive pricing model may be used to appropriately price the information and delivery the information anyway (as described below).

Thus, in this example, the promoter can be prevented from directly receiving useable personally identifiable information for the user before the user opts into an offer. However, the promoter can still cull offers that already have been accepted and/or presented too many times to the user, by virtue of using the hashed personally identifiable information. In some implementations, the JavaScript can also contain contact information (e.g., a server address to post information), and the JavaScript can directly send information from the client device to the advertiser's server, such that the information never is provided to the promoter. These techniques can be used simultaneously, in that some information can be sent directly to the advertiser and some information can be sent to the promoter.

Figure 14:
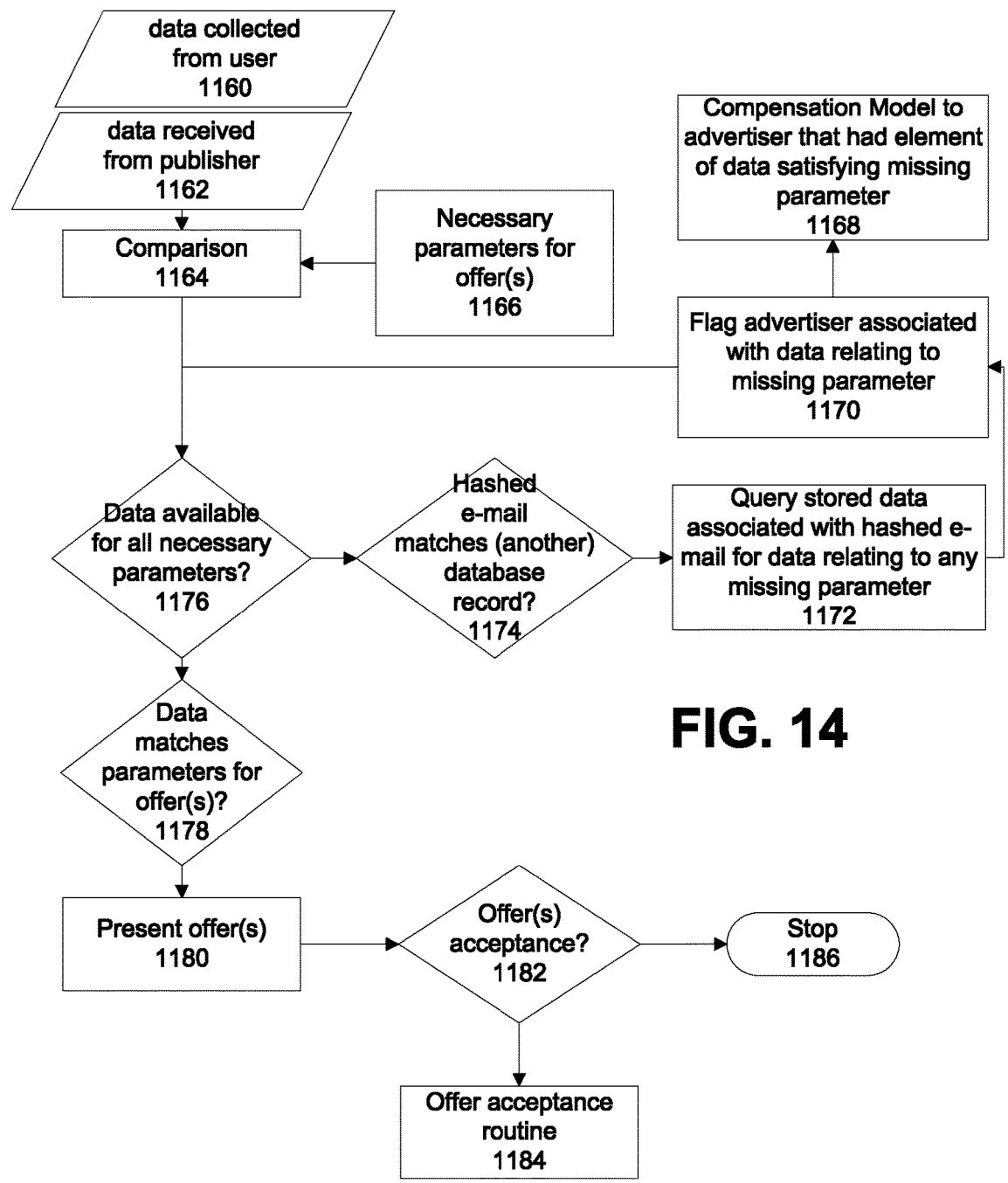
FIG. 14 depicts an example data rollup flow.

FIG. 14 depicts an example of a further technique that can make use of stored opt-in offer information that is associated with hashed personally identifiable information. As described previously, data can be collected from the user, here stored data 1160, and data can be received from the publisher (here, stored data 1162). These data can be used in a comparison 1162 with necessary parameters to be met for each potential offer (parameters 1166). If data is not available for all necessary parameters, then a hashed e-mail (or other hashed PII) can be used to determine whether any records in the system match this hashed PII. If there is a matching record, then the record is inspected to determine whether it contains any information that satisfies a required parameter of an offer, but where that data was not provided by the promoter or the user. In some cases, this data can be owned by an advertiser/client of the system. Therefore, the advertiser which provided data that was necessarily to qualify a given user for an offer can be flagged 1170, and a compensation model can be provided 1168, where the compensation model pays the advertiser for the use of their data. This cycle can repeat any number of times. Ultimately, if data is available for all necessary parameters (1176), and if all parameters are satisfied 91178), then the offer or offers are presented (1180). Responsive to offer acceptance (1182), an offer acceptance routine 1184 can be initiated. Otherwise, the method can terminate 1186.

FIG. 15 and FIG. 16 depict that hashed e-mails (or other one-way encrypted PII) can be used as keys to records that contain offer presentation information. Offer presentation information describes offers that were presented in association with each hashed PII. For example, an indication of offer acceptance 1211 is recorded for offer identifier 1209, with respect to hashed e-mail 1205. An impressions count 1207 can be associated with another offer identifier. The impressions count can be used to determine whether a maximum number of presentations of the offer has been reached. FIG. 16 depicts that for a given advertiser (e.g., advertiser 1215), data elements can be stored, e.g., data elements categories 1217 and 1219. Values 1213 and 1221 can be stored for such data elements, by example. It would be apparent to one of ordinary skill that a wide variety of organizations of such databases can be provided to meet the disclosures herein, and no implied limitation as to database structure is to be taken by the example presented.

Figure 17:
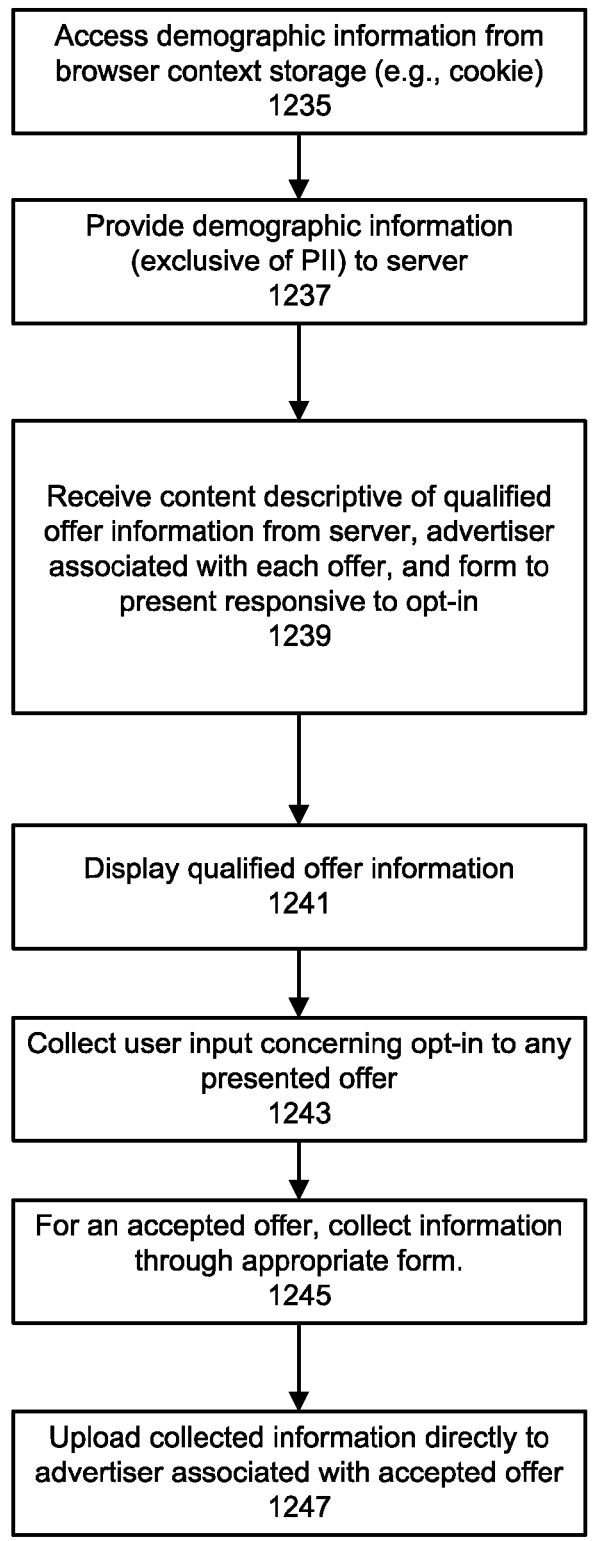
FIG. 17 depicts a method of uploading information for accepted opt-in contact information directly to commissioning advertisers.

FIG. 17 depicts an example flow in which a user can be qualified to have the opportunity to opt-into a given offer or offers, but where a server that determines qualification does not directly receive any personally identifiable information for such user. In this case, demographic information can be accessed (1235) by a client-side script and provided to the server 1237, the server compares the demographic information with parameters for available offers (and can filter, as described above). The offers can be indicated to the client-side script (if they were loaded previously) or transmitted in a markup page to the client (1239). The offer information is displayed 91241), and if they user opts-in to any offer, input is collected from the user (1243, 1245). PII can be uploaded to a location provided by the advertiser directly, without being touched or handled by a server maintained by the entity that qualified the user to receive the opt-in opportunity. Even as such PII goes to the advertiser directly, other information such as hashed PII and demographic information can be sent to the server that performed the qualification (or an affiliated server).

Figure 18:
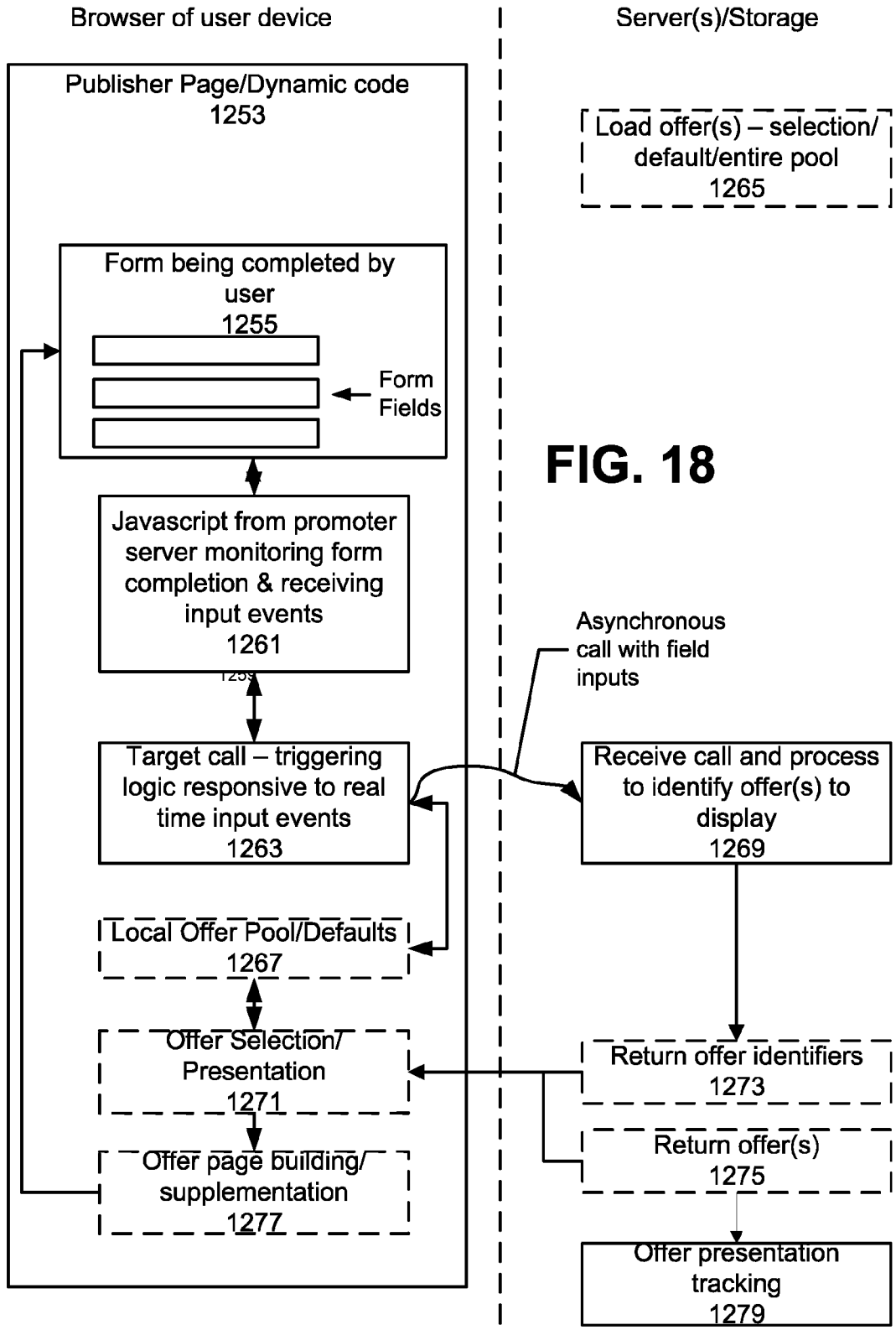
FIG. 18 depicts an example of on-page triggering event mechanism for offer qualification.

FIG. 18 depicts an example of a situation where offers can be selected for display responsive to real-time interaction between a user and a form on the user's device. An example of such a form includes a form to signup for a publisher service or otherwise register at a publisher site. In an example, such form includes a number of fields that request different demographic information, such as address, zip code, phone number, age, gender, interests, age, date of birth, and so on. Each candidate offer that can be presented to this user can have necessary parameters loaded in the JavaScript executing on the client browser. More generally, each offer can have a be associated with a specified trigger event, which can be for example, completion of a specified set of fields, focusing on a certain field, blurring after completing a given field or fields, and so on.

Responsive to a triggering event, the JavaScript can compare the information entered with necessary parameters for each candidate offer, and select an offer or offer to display to the user. The display of the offer can be delayed until the form is completed. The JavaScript also can submit the information provided at the point of the triggering event to the server, which can perform the comparison, and potentially access other information to be used in qualification of the user to be given a specific opt-in opportunity. In one implementations, the JavaScript can request information about the offer from the server while the user completes the form, such that the data is ready in the background. For example, high resolution graphics or logos can be downloaded in the background while the user completes the form itself However, such graphics do not need to be downloaded for all candidate offers, but only for those deemed available to be accepted. In some situations, the JavaScript can make request information for offers with parameters that are mostly satisfied, but not yet entirely (e.g., there has been no disqualifying event, but there remains an additional parameter to verify before qualification can be determined).

Returning to the example of FIG. 18, the JavaScript monitors 1261 the completion of the form, and generates a targeting call after a trigger event. The targeting call is used to cause the server to compare information submitted in the target call with required parameters of the offer. The call can be received and processed to identify other offers to display (1269). These can be provided to the client (or can be pre-loaded on client), and identified to the client (e.g., identifiers that are parsed by the JavaScript can be provided). For example offer identifiers (1273) or offer(s) 1275 can be returned. In all of the examples herein, when a name such as offer or offer identifier is described, it is understood that the underlying data descriptive of the object is being transmitted. Offer selection (for presentation) and presentation 1271 can be performed. These offers can be displayed in a portion of a window while the user is filling the form or can be displayed after some other triggering event). As discussed above, offer presentation tracking can be conducted 1279. Here, such presentation tracking can occur in real time. For any given form filling interaction, or other interaction of a user on a page, a number of interactions or triggering events can be caused, such that an evolutionary process of offer qualification can be performed.

Figure 19:
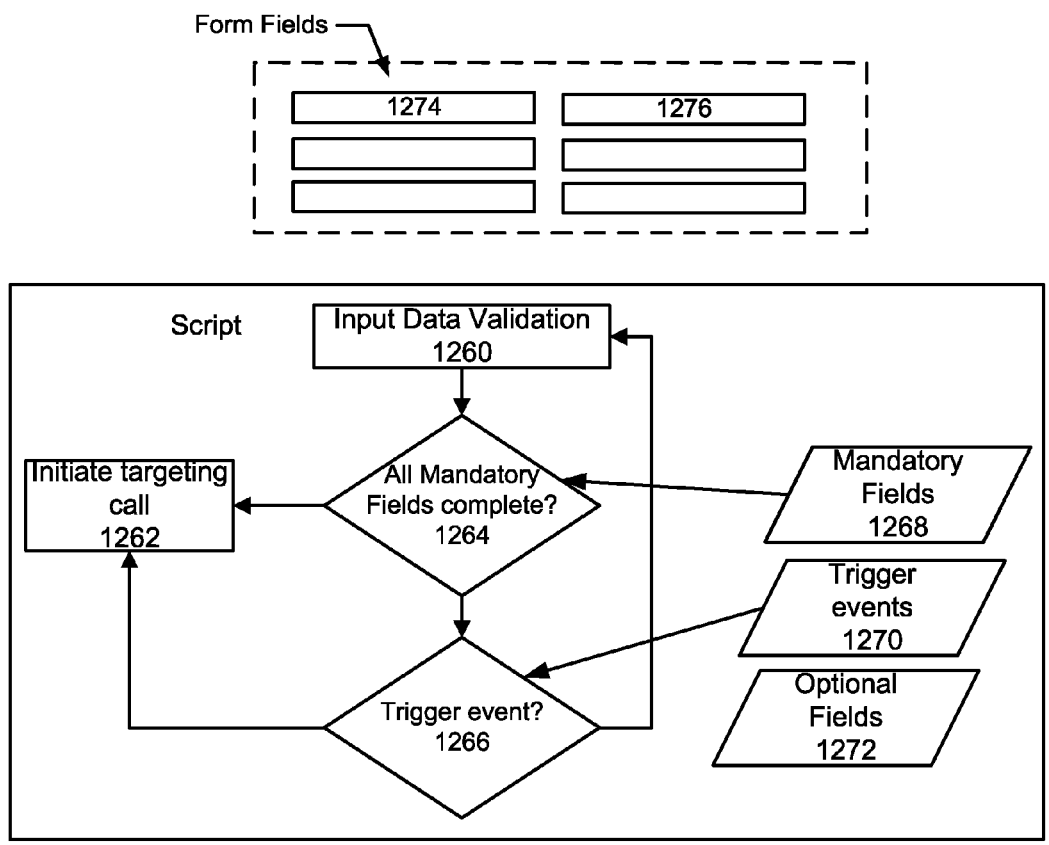
FIG. 19 depicts an example a method that can be performed by a script in FIG. 18.

FIG. 19 depicts further aspects of such a real-time scripting approach, in which the script can perform data validation 1260 (e.g., on data entered into fields 1274 and 1276), determine whether the mandatory fields or other events constituting a triggering event are satisfied (can be accessed from stored data 1268 or trigger event storage 1270). Fields that are optional but being gathered also can be specified 1272.

Figure 20:
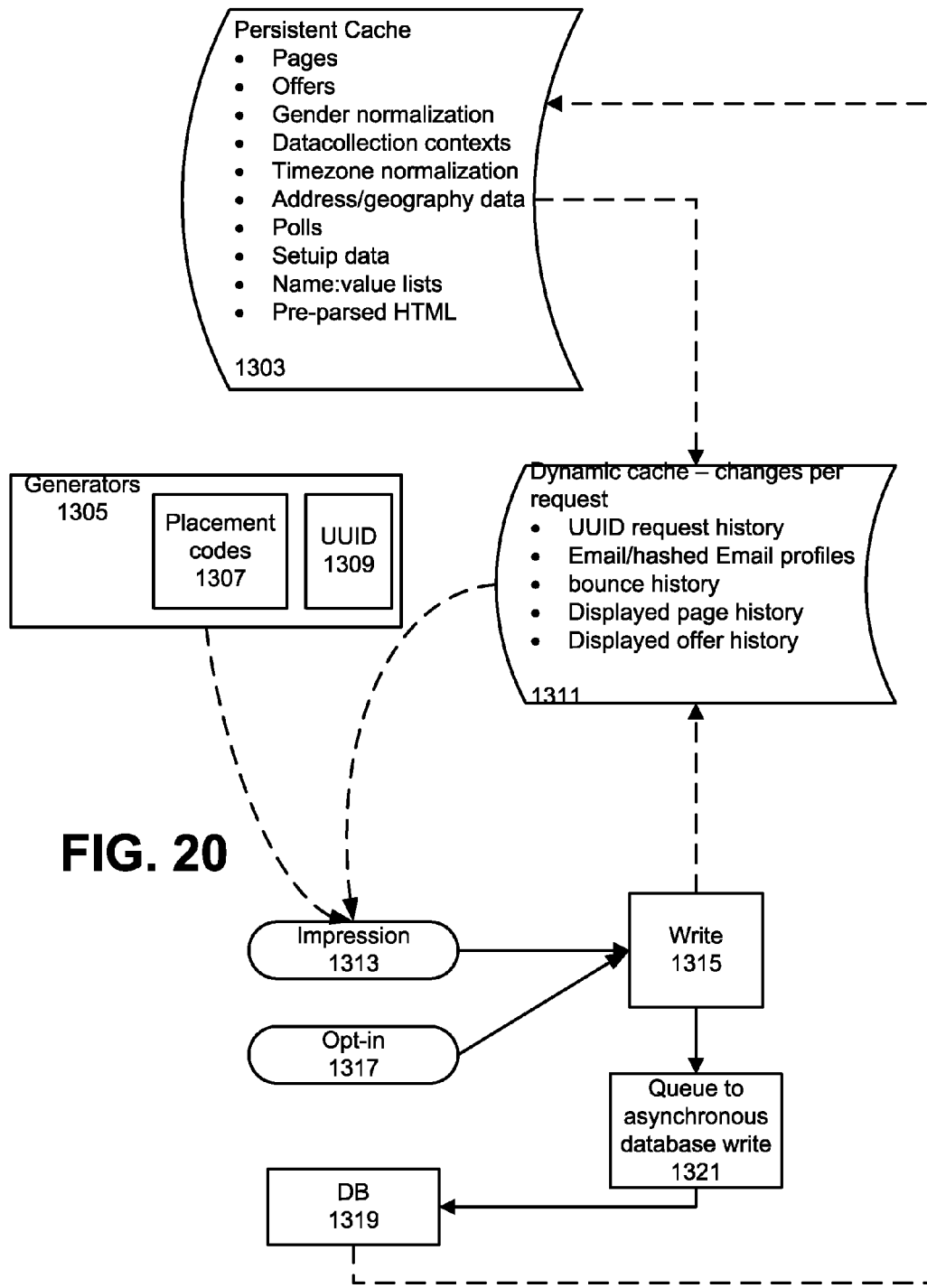
FIG. 20 depicts further aspects of a dataflow between server functional components in implementations of this disclosure.

FIG. 20 depicts a situation where a persistent cache stores a variety of information that is expected to be available in near real-time 1303. Generators 1305 create identifiers 1309 and can reference placement codes that correlate offers with particular advertiser engagements 1307. A dynamic cache is updated upon every interaction between client side scripts and the server 1311. Each impression 1313 generates a write 1315 to the cache 1311. Each opt-in event 1317 generates a write 1315 to the cache. The DB 1319 can be polled for updates by persistent cache 1303. DB 1319 is caught up with cache 1311 and 1303 by asynchronous write queue 1321.

Figure 21:
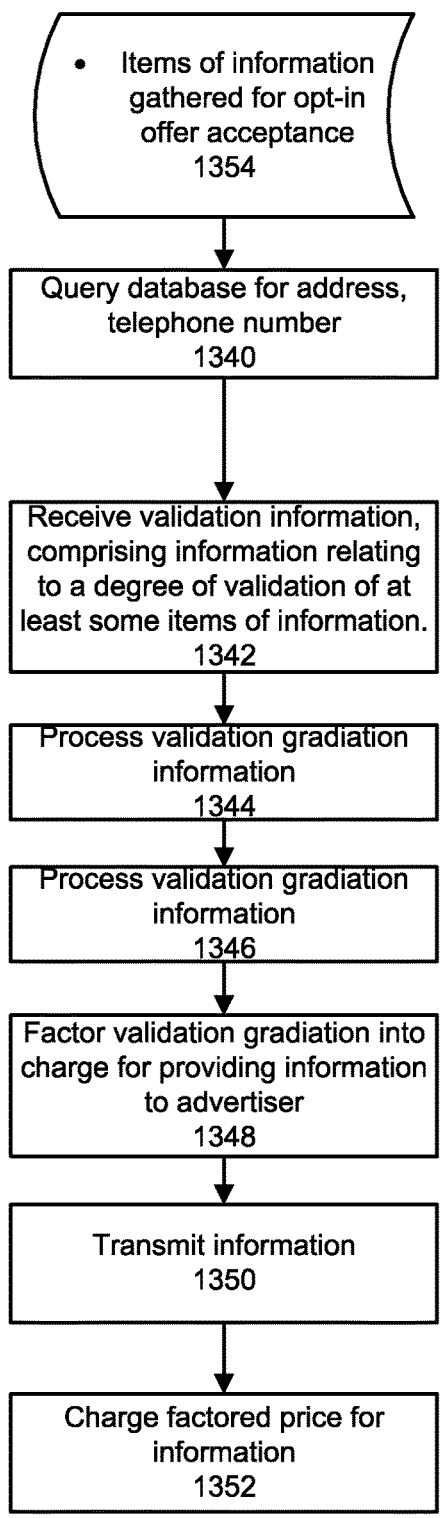
FIGS. 21 and 22 depict further example methods according to aspects of the disclosure.

FIG. 21 depicts a method for pricing information that was gathered during opt-in processing, but which may not be entirely correct or validated. The depicted method comprises accessing 1340 stored opt-in information and querying 1340 databases (e.g., third party or internal) to validate address, telephone number or portions thereof Validation information is received that indicates a degree of validation (1346) or a probability that the information is valid (13448). These gradations of validity are factored into the charge for providing the information to the commissioning advertiser. Such information is transmitted 1350 and the advertiser is billed 1352. For example, if a zip code of an address is deemed likely correct, while a street address is not correct, then the value of the address to the advertiser is reduced, but not zero. Therefore, an appropriate discount is applied.

Figure 22:
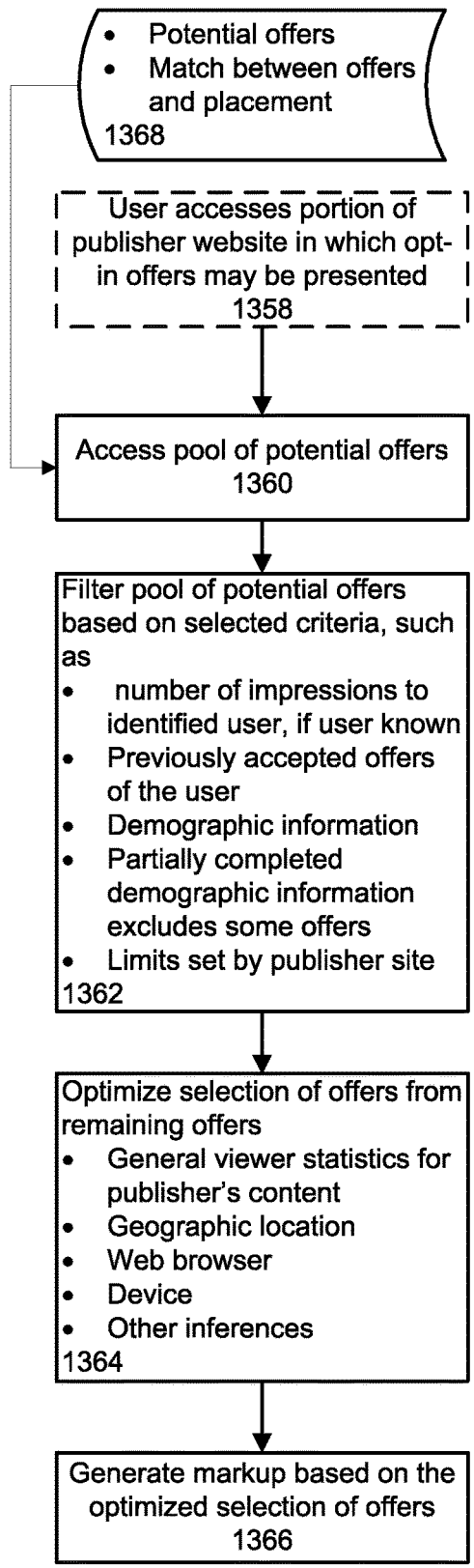

FIG. 22 depicts a method in which filtering and selection of offers to be submitted can be performed. Stored data 1368 is accessed 1360. Based on user interactions and other information available about a user (see above), filtering 1362 based on a variety of characteristics can be formed. Then, an optimization can be performed on the remaining offers (1364). Markup is generated (1366) for the optimized offers and provided for presentation on the client device.

JavaScript is used as an example of client-side scripting technology, and not by way of limitation of approaches to implementing client-side scripting and asynchronous interaction between a client device and a server, or a division of processing between client side and server side devices.

While the invention has been particularly shown and described with reference to a preferred embodiment thereof, it will be understood by those skilled in the art that various changes in form and detail maybe made without departing from the spirit and scope of the present invention as set for the in the following claims.

What is claimed is:

1. A machine implemented process of qualified offer presentation and acceptance, comprising:
   providing a script to a web browser executing in a device, from a promoter server, wherein the script is referenced in web page content originating from a content server that is being accessed by the web browser of the device;
   accessing, by the script executing in the web browser, state information provided from the content server and stored for the web browser, the state information comprising profile information about a user of the device, the profile information comprising one or more items of Personally Identifiable Information (PII) and one or more items of demographic information;
   one way hashing, by the script executing in the web browser, at least one item of the PII;
   sending the one-way hashed item of PII to the promoter server;
   sending at least one of the items of demographic information to the promoter server;
   using, at the promoter server, the one-way hashed item of PII to perform a database query to retrieve information comprising information indicative of which offers have been accepted by a user associated with that one-way hashed item of PII;
   determining, at the promoter server, one or more offers having qualification criteria that match the at least one item of demographic information and which have not been accepted by the user associated with that one-way hashed item of PII;
   sending to the script, an indication of the one or more matching offers;
   presenting one or more forms in the web browser on the device, having-at least one field for requesting offer-specific information specified by a respective third-party entity associated with each presented matching offer; and
   returning the offer-specific information entered by the user in each of the at least one fields to the promoter server.

2. The process of claim 1, further comprising obtaining personally identifiable information of the user through the one or more forms and providing that personally identifiable information to the promoter server in an unhashed format.

3. The process of claim 1, wherein the receiving of the indication from the promoter server comprises receiving information describing the offers, including receiving specifications of the fields for the offer-specific information to be requested for each of the matching offers.

4. The process of claim 1, wherein the presenting of the one or more forms, in the web browser, comprises first presenting the fields for requesting acceptance of the indicated matching offers, and responsively revealing fields for requesting offer-specific information for each offer accepted.

5. The process of claim 1, wherein the operations further comprise providing unhashed personally identifiable information directly from the user device to the third-party entity(ies) whose offer(s) were accepted, and for which personally identifiable information was collected as offer-specific information.

6. The process of claim 1, wherein the tangible machine readable media further store data for configuring the promoter serving system to store the demographic information of the user in association with the hashed personally identifiable information, and to provide the advertiser with the collected offer-specific information.

7. The process of claim 1, further comprising storing the one or more items of demographic information of the user in association with the hashed PII.

8. A computer-implemented method of generating opt-in contacts for advertisers, comprising
   accessing stored data representing respective sets of criteria provided by advertisers, each set of criteria specifying characteristics of desired recipients of an offer from that advertiser;
   communicating, from a promoter server, with a client device accessing content from a web server, the content of the web server comprising a web browser script, the communication comprising receiving demographic information from the device, to be used in a comparison with the sets of criteria provided by the advertisers;
   comparing the received demographic information with the sets of criteria to determine whether the received information indicates a match with any of the sets of criteria;
   sending, to the device, information for an offer for at least one of the sets of criteria that matched; and
   responsive to receiving an indication of acceptance of the offer(s) from the device,
      accessing information entered by a user of the device in a form being served from the web server,
      providing that information to a server operated by the advertiser responsible for that accepted offer,
      receiving one way hashed personally identifiable information about the user from the device, and
      storing the one way hashed personally identifiable information in association with information about the offers accepted by that user.

9. The computer-implemented method 8, wherein, the offers were presented to the users in conjunction with their accessing a plurality of different web servers, all referencing the web browser script.

10. The method of claim 8, further comprising:
   repeating the accessing and communicating in conjunction with a potentially different user accessing content from a further web server;
   receiving one way hashed personally identifiable information about the potentially different user, and demographic information about the potentially different user;
   comparing the one way hashed personally identifiable information with stored one-way hashed personally identifiable information, and
   wherein the sending comprises serving only offers that have not been indicated as accepted by stored information associated with the one way hashed personally identifiable information for the potentially different user, and for which the received demographic information matches.

11. The method of claim 8, wherein the sending comprises sending only offers that have not been indicated as accepted by stored information associated with that the hashed personally identifiable information for the potentially different user, for which the received demographic information matches, and which have not been presented to the user matching the one way hashed personally identifiable information more than a predetermined number of times.

12. A system for obtaining opt-in user information on behalf of advertisers, comprising:
a promoter serving system, comprising a tangible computer readable medium storing information describing sets of criteria specified by advertisers, each of the sets of criteria to be compared with demographic information for a particular user, prior to serving an offer associated with that set of criteria, and a processor configured to receive demographic information and compare that demographic information with the sets of criteria to identify a match;
a first script operable to be executed in a web browser on a user device, the first script to be referenced by a page of content available from a publisher web server, the script operable to receive profile information from the publisher web server relating to the user that is accessing content from the publisher web server using the web browser and to store received profile information as state information of the web browser;
a second script operable to be executed in the web browser of the user device, the second script operable to access the state information,
to provide demographic information contained in the state information to the promoter server system, and responsive to receiving an indication that the provided demographic information matches at least one offer, to present a form to request acceptance of the matched offer from the user, and to collect offer-specific information, and responsive to receiving an indication of acceptance of the offer, to provide one-way hashed personally identifiable information of the user to the promoter serving system, and wherein
the promoter serving system is operable to store the demographic information of the user in association with the hashed personally identifiable information, and to provide the advertiser with the collected offer-specific information.

13. The system of claim 12, wherein the promoter server system is further operable to store information identifying each offer accepted, in association with the hashed personally identifiable information.

14. The system of claim 13, wherein the promoter server is operable to compare stored hashed personally identifiable information with received hashed personally identifiable information and for any match, to identify any offers indicated as accepted for that match, and to exclude those identified further offers from being presented again for the user associated with the received hashed personally identifiable information.

15. The system of claim 13, wherein the promoter server is operable to perform a method comprising responsively receiving one way hashed personally identifiable information from instances of scripts executing in a plurality of content pages being served to different users, and
for each instance, comparing the received one way hashed personally identifiable information with stored one-way hashed personally identifiable information, and
where matches between stored and respectively received one-way hashed personally identifiable information are detected, excluding from consideration any offer indicated as being already accepted.

16. The system of claim 13, wherein the promoter server is operable to a method comprising counting a number of times an offer has been presented in association with a particular one-way hashed personally identifiable information.

17. The system of claim 16, wherein the method performed by the promoter server further comprises excluding from further presentation any offer that has been presented a pre-determined number of times.

18. A system of obtaining qualified opt-in contact information on behalf of third-parties, comprising:
a promoter server available to be accessed on the internet;
one or more web browser scripts integrating with a content page made available by a content provider, and operable
to obtain demographic information injected into the content page by a content provider server, the demographic information related to a user accessing the content page from a web browser running in a device,
to obtain at least one element of personally identifiable information,
to hash the personally identifiable information using a one-way hash, and
to provide the demographic information and hashed personally identifiable information to the promoter server; and
wherein the promoter server is operable to receive the demographic information and the hashed personally identifiable information, and to use the demographic information to identify offers from third-parties that have criteria matching to the demographic information, to use the hashed personally identifiable information in a database lookup to identify any offer that has been indicated as accepted and associated with the hashed personally identifiable information, and to exclude such identified offer from offers indicated to the one or more web browser scripts as matching the received demographic information.

19. The system of claim 18, wherein the one or more scripts are operable to receive the indicated matching offers, and to responsively display an opportunity in the web browser window to accept any of the indicated matching offers, and in response to receiving an indication of acceptance of a particular offer, presenting a respective form to collect information specified by the third-party responsible for that offer.

20. The system of claim 18, wherein the promoter server is operable to track a number of times each offer was presented for each individual hashed personally identifiable information, and to exclude an offer from further presentation responsive to reaching a maximum number of presentation times.

* * * * *